(12) United States Patent
Boling et al.

(10) Patent No.: US 12,079,197 B2
(45) Date of Patent: Sep. 3, 2024

(54) SYSTEMS AND METHODS FOR UPDATING METADATA

(71) Applicant: Dover Microsystems, Inc., Wayland, MA (US)

(72) Inventors: Eli Boling, Manchester, MA (US); Steven Milburn, Cranston, RI (US); Gregory T. Sullivan, Cambridge, MA (US); Andrew Sutherland, Portland, OR (US)

(73) Assignee: Dover Microsystems, Inc., Wayland, MA (US)

( * ) Notice: Subject to any disclaimer, the term of this patent is extended or adjusted under 35 U.S.C. 154(b) by 106 days.

(21) Appl. No.: 17/769,868

(22) PCT Filed: Oct. 16, 2020

(86) PCT No.: PCT/US2020/055952
§ 371 (c)(1),
(2) Date: Apr. 18, 2022

(87) PCT Pub. No.: WO2021/076871
PCT Pub. Date: Apr. 22, 2021

(65) Prior Publication Data
US 2022/0374415 A1 Nov. 24, 2022

Related U.S. Application Data

(60) Provisional application No. 62/916,902, filed on Oct. 18, 2019.

(51) Int. Cl.
*G06F 16/23* (2019.01)
*G06F 9/30* (2018.01)

(52) U.S. Cl.
CPC ........ *G06F 16/2365* (2019.01); *G06F 9/3013* (2013.01)

(58) Field of Classification Search
None
See application file for complete search history.

(56) References Cited

U.S. PATENT DOCUMENTS

| 5,201,056 A | 4/1993 | Daniel et al. |
| 5,377,336 A | 12/1994 | Eickemeyer et al. |

(Continued)

FOREIGN PATENT DOCUMENTS

| CN | 101558388 A | 10/2009 |
| CN | 102160033 A | 8/2011 |

(Continued)

OTHER PUBLICATIONS

U.S. Appl. No. 16/966,616, filed Jul. 31, 2020, Boling et al.

(Continued)

*Primary Examiner* — Son T Hoang
(74) *Attorney, Agent, or Firm* — Wolf, Greenfield & Sacks, P.C.

(57) ABSTRACT

Systems and methods for updating metadata. In some embodiments, in response to detecting an instruction executed by a hardware system, a source location of the instruction may be identified. First metadata associated with the instruction may be used to determine whether the instruction is allowed. In response to determining that the instruction is allowed, the source location of the instruction may be associated with second metadata.

27 Claims, 12 Drawing Sheets

(56) References Cited

U.S. PATENT DOCUMENTS

| | | |
|---|---|---|
| 5,488,730 A | 1/1996 | Brown, III et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B2 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,904,477 B2 | 9/2014 | Barton et al. |
| 8,874,850 B1 | 10/2014 | Goodson et al. |
| 8,875,170 B1 | 10/2014 | Daniel |
| 8,887,230 B2 | 11/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B1 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,635,960 B2 | 4/2023 | DeHon |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |

(56) References Cited

U.S. PATENT DOCUMENTS

| | | |
|---|---|---|
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0230451 A1* | 10/2006 | Kramer .................. G06F 16/17 |
| 2006/0242332 A1 | 10/2006 | Johnsen et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0201333 A1 | 8/2008 | Rowley |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0125830 A1* | 5/2010 | Lamana .................. G06F 16/23 |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332456 A1 | 12/2010 | Prahlad et al. |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0255018 A1 | 10/2012 | Sallam |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0312099 A1 | 11/2013 | Edwards et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |

(56) References Cited

U.S. PATENT DOCUMENTS

| | | |
|---|---|---|
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1* | 10/2017 | DeHon ............... G06F 16/23 |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0081829 A1* | 3/2018 | Kaplan ............... G06F 16/176 |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0268136 A1* | 9/2018 | Ng ............... G06F 16/2425 |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205140 A1* | 7/2019 | Grisenthwaite ....... G06F 16/245 |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1* | 8/2019 | Milburn ............... G06F 16/24 |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0406028 A1 | 12/2021 | Boling et al. |
| 2021/0406137 A1 | 12/2021 | Sutherland et al. |
| 2022/0012329 A1 | 1/2022 | Boling et al. |
| 2022/0043654 A1 | 2/2022 | DeHon et al. |
| 2022/0050904 A1* | 2/2022 | Sullivan ............... G06F 16/2365 |
| 2022/0092173 A1 | 3/2022 | Sutherland et al. |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0398312 A1 | 12/2022 | Sutherland et al. |
| 2023/0054942 A1 | 2/2023 | Milburn et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A1 | 6/2017 |
| WO | WO 2017/106103 A2 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

U.S. Appl. No. 17/711,092, filed Apr. 1, 2022, Boling et al.
U.S. Appl. No. 16/966,863, filed Jul. 31, 2020, Milburn et al.
U.S. Appl. No. 17/051,741, filed Oct. 29, 2020, Sutherland et al.
U.S. Appl. No. 16/966,865, filed Jul. 31, 2020, Milburn et al.
U.S. Appl. No. 17/774,799, filed May 5, 2022, Sutherland et al.
U.S. Appl. No. 17/507,398, filed Oct. 21, 2021, Milburn et al.
U.S. Appl. No. 17/292,694, filed May 10, 2021, Boling et al.
U.S. Appl. No. 17/312,675, filed Jun. 10, 2021, Sullivan et al.
U.S. Appl. No. 17/423,701, filed Jul. 16, 2021, Sutherland et al.
U.S. Appl. No. 16/966,866, filed Jul. 31, 2020, Boling et al.
U.S. Appl. No. 17/720,035, filed Apr. 13, 2022, Boling et al.
U.S. Appl. No. 17/560,975, filed Dec. 23, 2021, Boling et al.
U.S. Appl. No. 17/769,868, filed Apr. 18, 2022, Boling et al.
U.S. Appl. No. 17/308,868, filed May 5, 2021, Milburn et al.
U.S. Appl. No. 15/168,689, filed May 31, 2016, DeHon et al.
U.S. Appl. No. 15/426,098, filed Feb. 7, 2017, DeHon.
U.S. Appl. No. 15/624,878, filed Jun. 16, 2017, DeHon et al.
U.S. Appl. No. 15/695,541, filed Sep. 5, 2017, DeHon.
U.S. Appl. No. 16/002,642, filed Jun. 7, 2018, DeHon et al.
U.S. Appl. No. 16/002,757, filed Jun. 7, 2018, DeHon et al.
U.S. Appl. No. 16/002,957, filed Jun. 7, 2018, DeHon.
U.S. Appl. No. 16/002,987, filed Jun. 7, 2018, DeHon.
U.S. Appl. No. 16/062,791, filed Jun. 15, 2018, DeHon et al.
U.S. Appl. No. 16/256,640, filed Jan. 24, 2019, DeHon et al.
U.S. Appl. No. 16/684,172, filed Nov. 14, 2019, DeHon.
U.S. Appl. No. 16/905,680, filed Jun. 18, 2020, DeHon.
U.S. Appl. No. 16/929,692, filed Jul. 15, 2020, DeHon.
U.S. Appl. No. 16/062,796, filed Jun. 15, 2018, DeHon et al.
U.S. Appl. No. 16/264,773, filed Feb. 1, 2019, Milburn et al.
U.S. Appl. No. 17/474,830, filed Sep. 14, 2021, Milburn et al.
U.S. Appl. No. 17/452,271, filed Oct. 26, 2021, DeHon.
PCT/US2019/016272, Apr. 8, 2019, International Search Report and Written Opinion.
PCT/US2019/016272, Aug. 13, 2020, International Preliminary Report on Patentability.
PCT/US2019/016276, Apr. 26, 2019, International Search Report and Written Opinion.

(56) References Cited

OTHER PUBLICATIONS

PCT/US2019/016276, Aug. 13, 2020, International Preliminary Report on Patentability.
PCT/US2019/029880, Aug. 8, 2019, International Search Report and Written Opinion.
PCT/US2019/029880, Nov. 12, 2020, International Preliminary Report on Patentability.
PCT/US2019/016317, Apr. 16, 2019, International Search Report and Written Opinion.
PCT/US2019/016317, Aug. 13, 2020, International Preliminary Report on Patentability.
PCT/US2020/059057, Feb. 8, 2021, International Search Report and Written Opinion.
PCT/US2016/066188, Jul. 13, 2017, International Search Report and Written Opinion.
PCT/US2016/066194, Apr. 7, 2017, International Search Report and Written Opinion.
PCT/US2019/016242, Mar. 29, 2019, International Search Report and Written Opinion.
PCT/US2019/060030, May 20, 5021, International Search Report and Written Opinion.
PCT/US2019/060698, May 20, 2021, International Search Report and Written Opinion.
PCT/US2019/067084, Jul. 2, 2021, International Search Report and Written Opinion.
PCT/US2019/013678, Apr. 15, 2020, Invitation to Pay Additional Fees.
PCT/US2019/013678, Jul. 29, 2021, International Search Report and Written Opinion.
PCT/US2019/016295, May 3, 2019, Invitation to Pay Additional Fees.
PCT/US2019/016295, Jun. 26, 2019, International Search Report and Written Opinion.
PCT/US2019/016295, Aug. 13, 2020, International Preliminary Report on Patentability.
PCT/US2021/020602, May 11, 2021, International Search Report and Written Opinion.
PCT/US2020/055952, Jan. 28, 2021, International Search Report and Written Opinion.
PCT/US2020/055952, Apr. 28, 2022, International Preliminary Report on Patentability.
PCT/US2019/060028, Mar. 23, 2020, International Search Report and Written Opinion.
PCT/US2019/060028, May 20, 2021, International Preliminary Report on Patentability.
U.S. Appl. No. 17/908,879, filed Sep. 1, 2022, Milburn et al.
U.S. Appl. No. 17/880,539, filed Aug. 3, 2022, Milburn et al.
PCT/US2020/059057, May 19, 2022, International Preliminary Report on Patentability.
PCT/US2019/060030, Mar. 19, 2020, International Search Report and Written Opinion.
PCT/US2019/060698, Feb. 3, 2020, International Search Report and Written Opinion.
PCT/US2019/067084, Mar. 19, 2020, International Search Report and Written Opinion.
PCT/US2019/013678, Jun. 23, 2020, International Search Report and Written Opinion.
PCT/US2021/020602, Sep. 15, 2022, International Preliminary Report on Patentability.
International Search Report and Written Opinion for International Application No. PCT/US2019/016242 mailed Mar. 29, 2019.
International Search Report and Written Opinion for International Application No. PCT/US2016/066194 mailed Apr. 7, 2017.
International Search Report and Written Opinion for International Application No. PCT/US2016/066188 mailed Jul. 13, 2017.
Invitation to Pay Additional Fees for International Application No. PCT/US2019/016295 mailed May 3, 2019.
International Search Report and Written Opinion for International Application No. PCT/US2019/016295 mailed Jun. 26, 2019.
International Preliminary Report on Patentability for International Application No. PCT/US2019/016295 mailed Aug. 13, 2020.
International Search Report and Written Opinion for International Application No. PCT/US2019/016276 mailed Apr. 26, 2019.
International Search Report and Written Opinion for International Application No. PCT/US2019/029880 mailed Aug. 8, 2019.
International Search Report and Written Opinion for International Application No. PCT/US2019/016317 mailed Apr. 16, 2019.
International Search Report and Written Opinion for International Application No. PCT/US2020/059057 mailed Feb. 8, 2021.
International Search Report and Written Opinion for International Application No. PCT/US2019/060030 mailed May 20, 2021.
International Search Report and Written Opinion for International Application No. PCT/US2019/060698 mailed May 20, 2021.
International Search Report and Written Opinion for International Application No. PCT/US2019/067084 mailed Jul. 1, 2021.
International Search Report and Written Opinion for International Application No. PCT/US2019/013678 mailed Jul. 29, 2021.
Invitation to Pay Additional Fees for International Application No. PCT/US2019/013678 mailed Apr. 15, 2020.
International Search Report and Written Opinion for International Application No. PCT/US2021/020602 mailed May 11, 2021.
International Search Report and Written Opinion for International Application No. PCT/US2020/055952 mailed Jan. 28, 2021.
International Preliminary Report on Patentability for International Application No. PCT/US2019/060028 mailed May 20, 2021.
International Search Report and Written Opinion for International Application No. PCT/US2019/060028 mailed Mar. 23, 2020.
International Search Report and Written Opinion for International Application No. PCT/US2019/016272 mailed Apr. 8, 2019.
International Preliminary Report on Patentability for International Application No. PCT/US2019/016272 mailed Aug. 13, 2020.
International Preliminary Report on Patentability for International Application No. PCT/US2019/016276 mailed Aug. 13, 2020.
International Preliminary Report on Patentability for International Application No. PCT/US2019/029880 mailed Nov. 12, 2020.
International Preliminary Report on Patentability for International Application No. PCT/US2019/016317 mailed Aug. 13, 2020.
International Preliminary Report on Patentability for International Application No. PCT/US2020/055952 mailed Aug. 13, 2020.
[No Author Listed], Arm Limited: AMBA® AXI™ and ACE™ Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34$^{th}$ Annual International Symposium In Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
DeHon et al., DOVER A Metadata-Extended RISC-V. Jan. 6, 2016:34. [https://web.archive.org/web/20160331131339 if /http://riscv.org/wp-content/uploads/2016/01/Wedl430-dover riscv Jan. 2016 v3.pdf].
DeHon et al., DOVER: A metadata-extended RISC-V. RISC-V Workshop Oracle Conference Center, Redwood Shores, CA. Jan. 6, 2016. 33 pages.

(56) References Cited

OTHER PUBLICATIONS

Dhawan et al., Architectural support for software-defined metadata processing. Proceedings of the Twentieth International Conference on Architectural Support for Programming Languages and Operating Systems (ASPLOS). Mar. 1, 20154:487-502.
Dhawan et al., Area-efficient near-associative memories on FPGAs. ACM Transactions on Reconfigurable Technology and Systems (TRETS). Jan. 2, 20153;7(4):1-22.
Dhawan et al., PUMP: a programmable unit for metadata processing. Proceedings of the Third Workshop on Hardware and Architectural Support for Security and Privacy (HASP). Jun. 1, 20145:1-8.
Engelke et al., Efficient LLVM-Based Dynamic Binary Translation. Acm Vee. Apr. 1, 20216;165-71.
Evans et al., Melding security metadata between software and hardware. Proceedings of the Posters and Demo Track Dec. 3, 2012:1-2.
Geater, Tee requirements for ISA. Thales eSecurity. 2018. 21 pages.
Hritcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.
Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 2, 20099:105-14.
Mambretti et al., Trellis: Privilege separation for multi-user applications made easy. International Symposium on Research in Attacks, Intrusions, and Defenses. Springer, Cham. Sep. 1, 20169:437-56.
Nagarakatte et al., SoftBound: Highly Compatible and Complete Spatial Memory Safety for C. University of Pennsylvania Department of Computer and Information Science Technical Report. Jan. 2009. 12 pages.
Okhravi et al., One Giant Leap for Computer Security. IEEE Computer and Reliability Societies. Jul. 2020/Aug. 18(4):8-19.
Ozsoy et al., Sift: A low-overhead dynamic information flow tracking architecture for smt processors. Proceedings of the 8th ACM International Conference on Computing Frontiers. May 3, 2011:1-11.
Roessler et al., Protecting the stack with metadata policies and tagged hardware. 2018 IEEE Symposium on Security and Privacy (SP) May 2, 20180;478-95.
Song et al., Security tagging for a zero-kernel operating system. 2013 46th Hawaii International Conference on System Sciences Jan. 7, 2013:5049-58.
Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].
Suh et al., Secure Program Execution via Dynamic Information Flow Tracking. MIT CSAIL. Jul. 2003. 14 pages.
Sullivan et al., The dover inherently secure processor. 2017 IEEE International Symposium on Technologies for Homeland Security (HST) Apr. 25, 2017:1-5.
Tiwari et al., A small cache of large ranges: Hardware methods for efficiently searching, storing, and updating big dataflow tags. 2008 41st IEEE/ACM International Symposium on Microarchitecture Nov. 8, 2008:94-105.
Tiwari et al., Complete information flow tracking from the gates up. InProceedings of the 14th international conference on Architectural support for programming languages and operating systems Mar. 7, 2009;109-20.
Waterman et al., The RISC-V Instruction Set Manual, vol. I: Unprivileged ISA, Document Version Dec. 13, 2019. RISC-V Foundation. Dec. 2019. 238 pages.
Watson et al., Cheri: A hybrid capability-system architecture for scalable software compartmentalization. 2015 IEEE Symposium on Security and Privacy Sep. 2015;20-37.
Witchel et al., Mondrian Memory Protection. ASPLOS-X. 2002;13 pages.
Woodruff, Cheri: A RISC capability machine for practical memory safety. University of Cambridge, Computer Laboratory; 2014. 112 pages.
Zeldovich et al., Hardware Enforcement of Application Security Policies Using Tagged Memory. USENIX Symposium on Operating Systems Design and Implementation. Dec. 8, 2008:8;225-40.
International Preliminary Report on Patentability for International Application No. PCT/US2020/059057, mailed May 19, 2022.
International Search Report and Written Opinion for International Application No. PCT/US2019/060030 mailed Mar. 19, 2020.
International Search Report and Written Opinion for International Application No. PCT/US2019/060698 mailed Feb. 3, 2020.
International Search Report and Written Opinion for International Application No. PCT/US2019/067084 mailed Mar. 19, 2020.
International Search Report and Written Opinion for International Application No. PCT/US2019/013678 mailed Jun. 23, 2020.
International Preliminary Report on Patentability for International Application No. PCT/US2021/020602, mailed Sep. 15, 2022.
International Preliminary Report on Patentability for International Application No. PCT/US2020/055952 mailed Apr. 28, 2022.
Dhawan et al., Area-efficient near-associative memories on FPGAs. ACM Transactions on Reconfigurable Technology and Systems (TRETS). Jan. 23, 2015;7(4):1-22.
Mutlu, 18-447 Computer Architecture Lecture 11: Precise Exceptions, State Maintenance, State Recovery. Carnegie Mellon University Lecture. Feb. 11, 2015, 49 pages.
International Search Report and Written Opinion mailed Jan. 11, 2023 for International Application No. PCT/US2022/042492.

* cited by examiner

SYSTEMS AND METHODS FOR UPDATING METADATA

RELATED APPLICATION

This application is a national stage filing under 35 U.S.C. § 371 of International Patent Application Serial No. PCT/US2020/055952, filed Oct. 16, 2020, entitled "SYSTEMS AND METHODS FOR UPDATING METADATA", which claims the benefit under 35 U.S.C. § 119(e) of U.S. Provisional Patent Application Ser. No. 62/916,902, filed on Oct. 18, 2019, titled "SYSTEMS AND METHODS FOR UPDATING METADATA,". The contents of these applications are incorporated herein by reference in their entirety.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals rush to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a method for updating metadata is provided, comprising acts of: in response to detecting an instruction executed by a host processor, identifying a storage location read by the instruction; determining, based at least in part on first metadata associated with the instruction, whether the instruction is allowed; and in response to determining that the instruction is allowed, causing the storage location to be associated with second metadata, the second metadata being different from first metadata.

In accordance with some embodiments, a method for updating metadata is provided, comprising acts of: in response to detecting an instruction executed by a hardware system, identifying a source location of the instruction; determining, based at least in part on first metadata associated with the instruction whether the instruction is allowed, wherein: determining whether the instruction is allowed comprises identifying a rule that matches one or more inputs, the one or more inputs comprising the first metadata associated with the instruction; and the rule maps the one or more inputs to one or more outputs, the one or more outputs comprising second metadata to be associated with the source location of the instruction; and in response to determining that the instruction is allowed, causing the source location of the instruction to be associated with the second metadata.

In accordance with some embodiments, a system is provided, comprising circuitry and/or one or more processors programmed by executable instructions, wherein the circuitry and/or the one or more programmed processors are configured to perform any of the methods described herein.

In accordance with some embodiments, at least one computer-readable medium is provided, having stored thereon at least one netlist for any of the circuitries described herein.

In accordance with some embodiments, at least one computer-readable medium is provided, having stored thereon at least one hardware description that, when synthesized, produces any of the netlists described herein.

In accordance with some embodiments, at least one computer-readable medium is provided, having stored thereon any of the executable instructions described herein.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory.

An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

Figure 1:
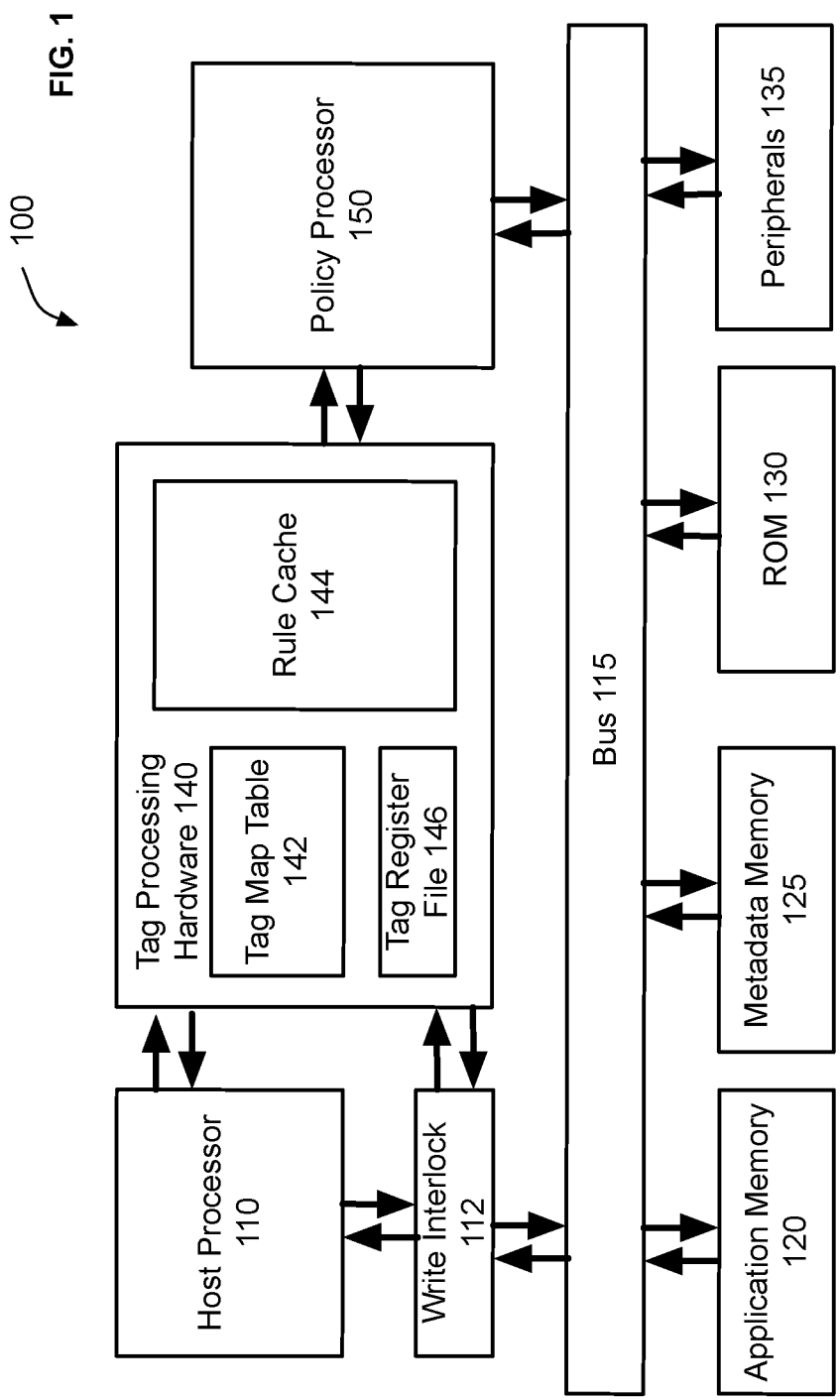
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map an address X in the application memory 120 to an address Y in the metadata memory 125. A value stored at the address Y is sometimes referred to herein as a "metadata tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata label RED may be stored at the metadata memory address Z. By storing the metadata memory address Z in the metadata memory address Y, the application data stored at the application memory address X may be tagged RED.

In this manner, the binary representation of the metadata label RED may be stored only once in the metadata memory 125. For instance, if application data stored at another application memory address X' is also to be tagged RED, the tag map table 142 may map the application memory address X' to a metadata memory address Y' where the metadata memory address Z is also stored.

Moreover, in this manner, tag update may be simplified. For instance, if the application data stored at the application memory address X is to be tagged BLUE at a subsequent time, a metadata memory address Z' may be written at the metadata memory address Y, to replace the metadata memory address Z, and a binary representation of the metadata label BLUE may be stored at the metadata memory address Z'.

Thus, the inventors have recognized and appreciated that a chain of metadata memory addresses of any suitable length N may be used for tagging, including N=0 (e.g., where a binary representation of a metadata label is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single metadata tag, so that all words in that region are associated with the same metadata. This may advantageously reduce a size of the tag map table 142 and/or the metadata memory 125. For example, a single metadata tag may be maintained for an entire address range, as opposed to maintaining multiple metadata tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructive read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding metadata tag. Additionally, or alternatively, for a register identifier received from the host processor 110, the tag processing hardware 140 may access a metadata tag from a tag register file 146 within the tag processing hardware 140.

In some embodiments, if an application memory address does not have a corresponding entry in the tag map table 142, the tag processing hardware 140 may send a query to a policy processor 150. The query may include the application memory address in question, and the policy processor 150 may return a metadata tag for that application memory address. Additionally, or alternatively, the policy processor 150 may create a new tag map entry for an address range including the application memory address. In this manner, the appropriate metadata tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a metadata tag for a program counter, a metadata tag for an application memory address from which the instruction is fetched (e.g., a word in memory to which the program counter points), a metadata tag for a register in which an operand of the instruction is stored, and/or a metadata tag for an application memory address referenced by the instruction. In one example, the instruction may be a load instruction, and an operand of the instruction may be an application memory address from which application data is to be loaded. The query may include, among other things, a metadata tag for a register in which the application memory address is stored, as well as a metadata tag for the application memory address itself. In another example, the instruction may be an arithmetic instruction, and there may be two operands. The query may include, among other things, a first metadata tag for a first register in which a first operand is stored, and a second metadata tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input metadata tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output metadata tags) to be returned to the tag processing hardware 140. As one example, the instruction may be a store instruction, and the policy processor 150 may compute an output metadata tag for an application memory address to which application data is to be stored. As another example, the instruction may be an arithmetic instruction, and the policy processor 150 may compute an output metadata tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more inputs to a decision and/or one or more outputs. For instance, a query into the rule cache 144 may be similarly constructed as a query to the policy processor 150 to check if an instruction executed by the host processor 110 should be allowed. If there is a cache hit, the rule cache 144 may output a decision as to whether to the instruction should be allowed, and/or one or more output metadata tags (e.g., as described above in connection with the policy processor 150). Such a mapping in the rule cache 144 may be created using a query response from the policy processor 150. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input metadata tags, the tag processing hardware 140 may first query the rule cache 144 with the one or more input metadata tags. In case of a cache hit, the tag processing hardware 140 may proceed with a decision and/or one or more output metadata tags from the rule cache 144, without querying the policy processor 150. This may provide a significant speedup. In case of a cache miss, the tag processing hardware 140 may query the policy processor 150, and may install a response from the policy processor 150 into the rule cache 144 for potential future use.

In some embodiments, the tag processing hardware 140 may form a hash key based on one or more input metadata tags, and may present the hash key to the rule cache 144. In case of a cache miss, the tag processing hardware 140 may send an interrupt signal to the policy processor 150. In response to the interrupt signal, the policy processor 150 may fetch metadata from one or more input registers (e.g., where the one or more input metadata tags are stored), process the fetched metadata, and write one or more results to one or more output registers. The policy processor 150 may then signal to the tag processing hardware 140 that the one or more results are available.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output metadata tags (e.g., as received from the rule cache 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate metadata tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the rule cache 144 may be implemented with a hash function and a designated portion of a memory (e.g., the metadata memory 125). For instance, a hash function may be applied to one or more inputs to the rule cache 144 to generate an address in the metadata memory 125. A rule cache entry corresponding to the one or more inputs may be stored to, and/or retrieved from, that address in the metadata memory 125. Such an entry may include the one or more inputs and/or one or more corresponding outputs, which may be computed from the one or more inputs at run time, load time, link time, or compile time.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
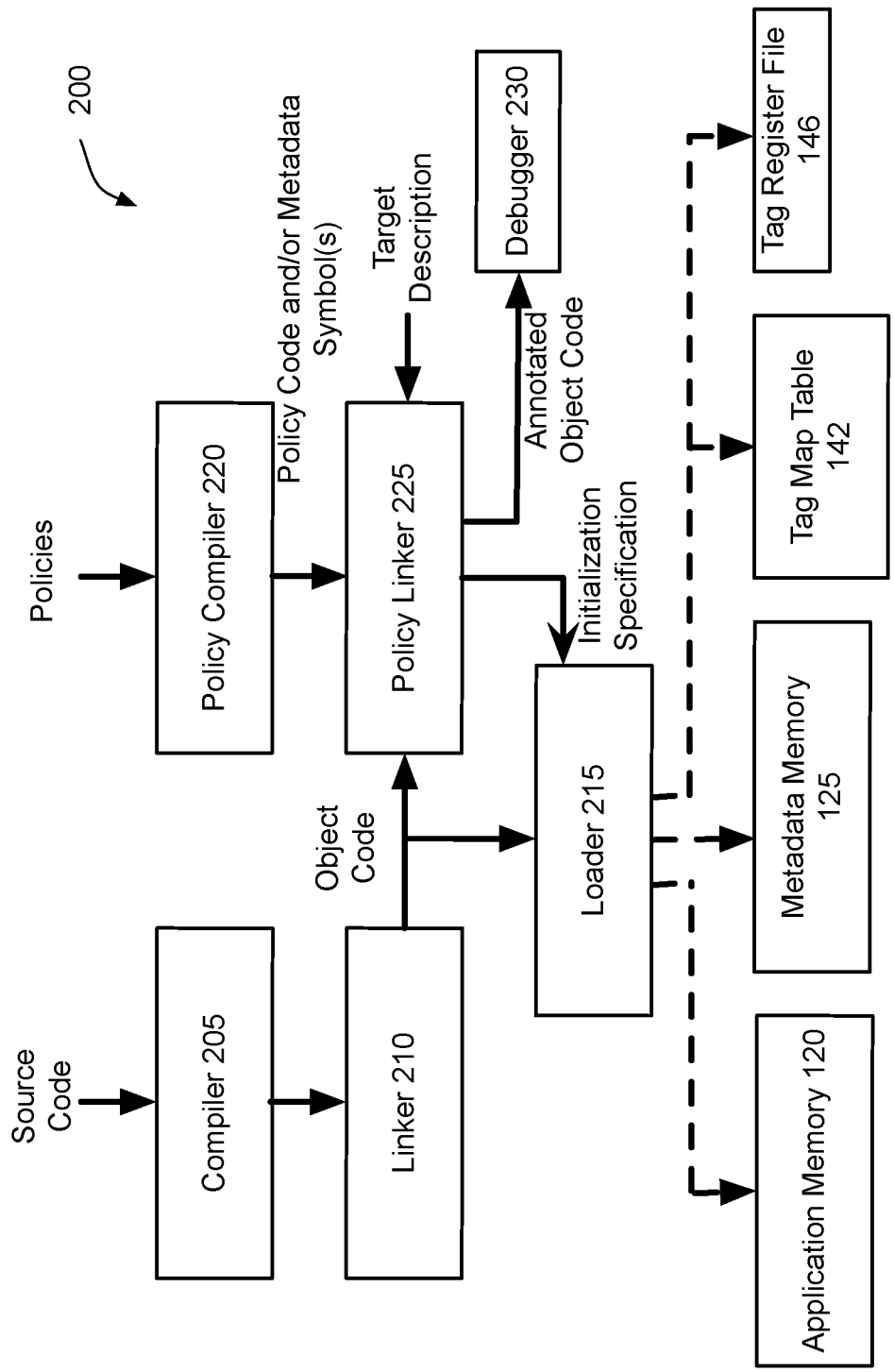
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 in the example of FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as FRAME locations, and as function epilogue instructions execute, the FRAME metadata tags may be removed. The stack policy may indicate that instructions implementing a body of the function (as opposed to function prologue and function epilogue) only have read access to FRAME locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate one or more policies written in a policy language into policy code. For instance, the policy compiler 220 may output policy code in C or some other suitable programming language. Additionally, or alternatively, the policy compiler 220 may output one or more metadata labels referenced by the one or more policies. At initialization, such a metadata label may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "metadata tag."

It should be appreciated that aspects of the present disclosure are not limited to resolving metadata labels at load time. In some embodiments, one or more metadata labels may be resolved statically (e.g., at compile time or link time). For example, the policy compiler 220 may process one or more applicable policies, and resolve one or more metadata labels defined by the one or more policies into a statically-determined binary representation. Additionally, or alternatively, the policy linker 225 may resolve one or more metadata labels into a statically-determined binary representation, or a pointer to a data structure storing a statically-determined binary representation. The inventors have recognized and appreciated that resolving metadata labels statically may advantageously reduce load time processing. However, aspects of the present disclosure are not limited to resolving metadata labels in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 in the example of FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata labels, and the policy linker 225 may search the target description to identify entities having those entity names. The policy linker 225 may identify descriptions of those entities from the target description, and use the descriptions to annotate, with appropriate metadata labels, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description (or simply ignore) entity descriptions with no corresponding "init" statement.

In some embodiments, the loader 215 may initialize a target system based on an initialization specification produced by the policy linker 225. For instance, referring to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

In some embodiments, the policy linker 225 and/or the loader 215 may maintain a mapping of binary representations of metadata back to human readable versions of metadata labels. Such a mapping may be used, for example, by a debugger 230. For instance, in some embodiments, the debugger 230 may be provided to display a human readable version of an initialization specification, which may list one or more entities and, for each entity, a set of one or more metadata symbols associated with the entity. Additionally, or alternatively, the debugger 230 may be programmed to display assembly code annotated with metadata labels, such as assembly code generated by disassembling object code annotated with metadata labels. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

Referring again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input metadata tags to output metadata tags, and, in some embodiments, the input metadata tags may be metadata memory addresses where binary representations of metadata are stored, as opposed to the binary representations themselves. The inventors have recognized and appreciated that if a same binary representation of metadata is stored at two different metadata memory addresses X and Y, the rule cache 144 may not recognize an input pattern having the metadata memory address Y as matching a stored mapping having the metadata memory address X. This may result in a large number of unnecessary rule cache misses, which may degrade system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the illustrative metadata memory 125 in the example of FIG. 1), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150 in the example of FIG. 1). If the binary representation of metadata has already been stored, a reference to the existing storage location may be used (e.g., installed in the illustrative rule cache 144 in the example of FIG. 1).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and/or discussed in greater detail below may be implemented in any of numerous ways, as these techniques are not limited to any particular manner of implementation. Examples of implementation details are provided herein solely for purposes of illustration. Furthermore, the techniques disclosed herein may be used individually or in any suitable combination, as aspects of the present disclosure are not limited to any particular technique or combination of techniques.

For instance, while examples are discussed herein that include a compiler (e.g., the illustrative compiler 205 and/or the illustrative policy compiler 220 in the example of FIG. 2), it should be appreciated that aspects of the present disclosure are not limited to using a compiler. In some embodiments, a software toolchain may be implemented as an interpreter. For example, a lazy initialization scheme may be implemented, where one or more default labels (e.g., UNINITIALIZED) may be used for tagging at startup, and a policy processor (e.g., the illustrative policy processor 150 in the example of FIG. 1) may evaluate one or more policies and resolve the one or more default labels in a just-in-time manner.

Figure 3A:
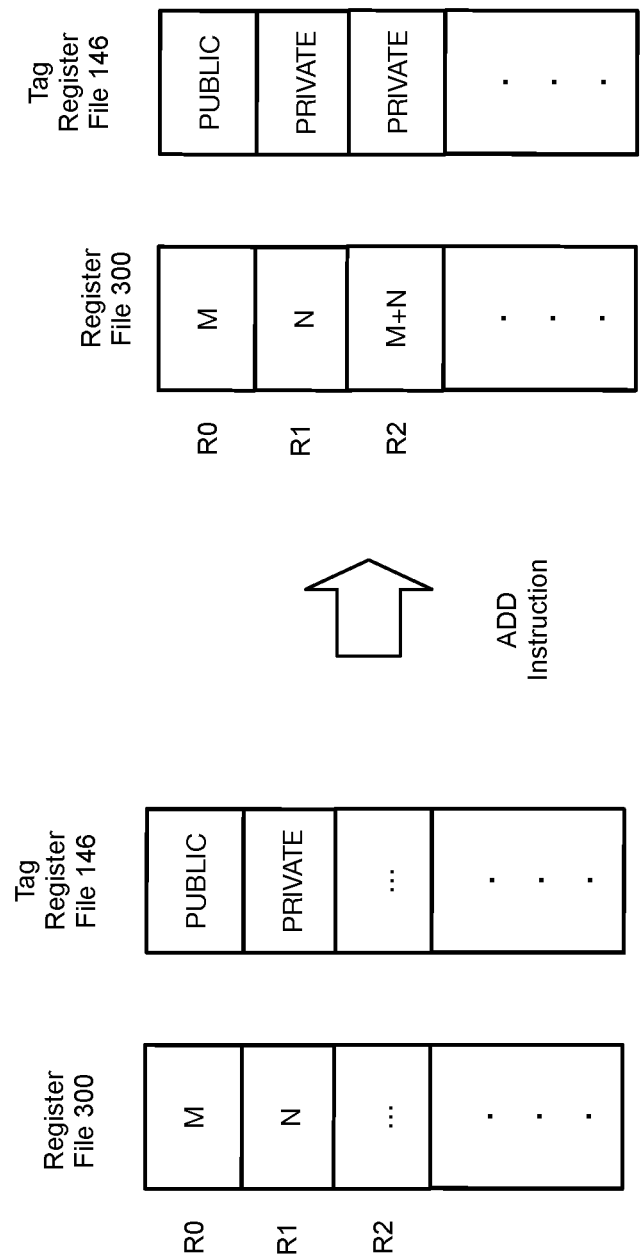
FIGS. 3A-C show an illustrative register file 300, in accordance with some embodiments.
Figure 3B:
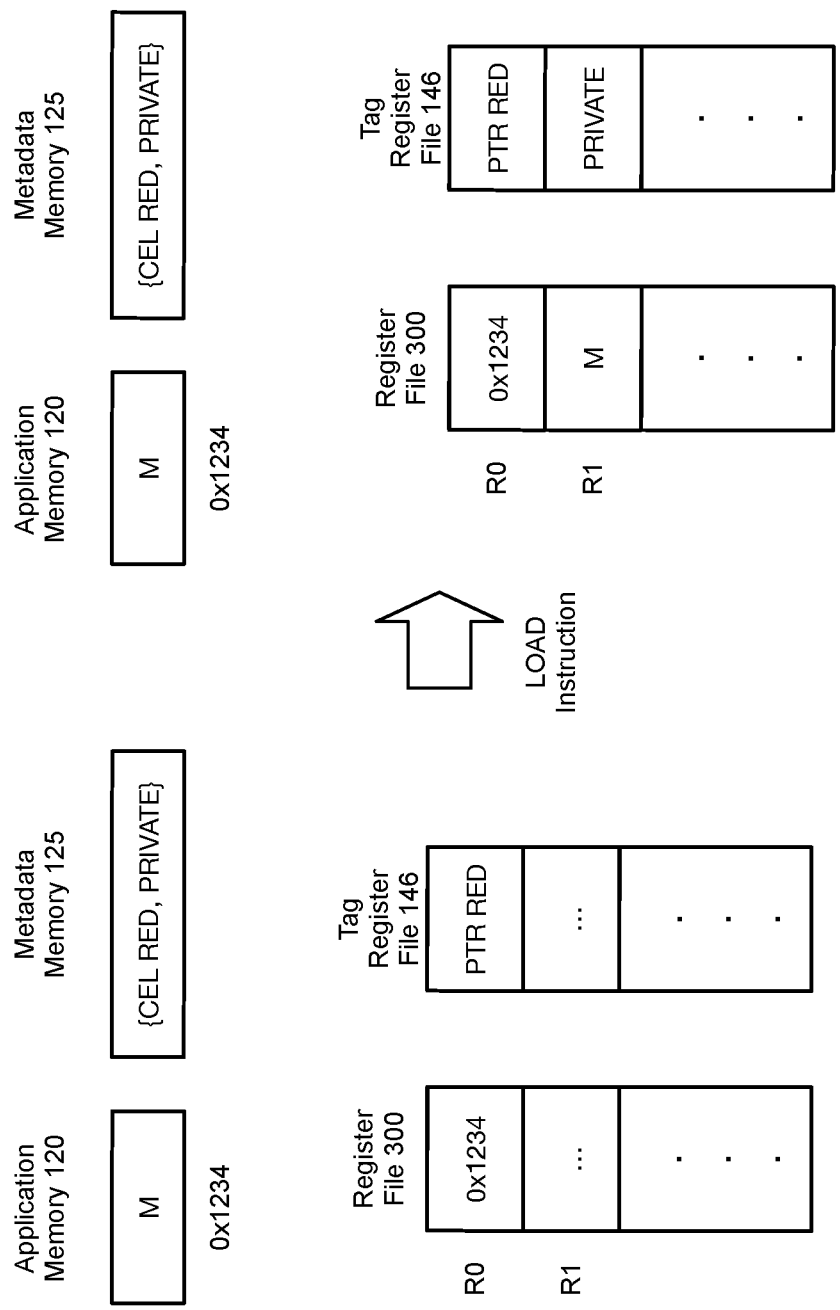
Figure 3C:
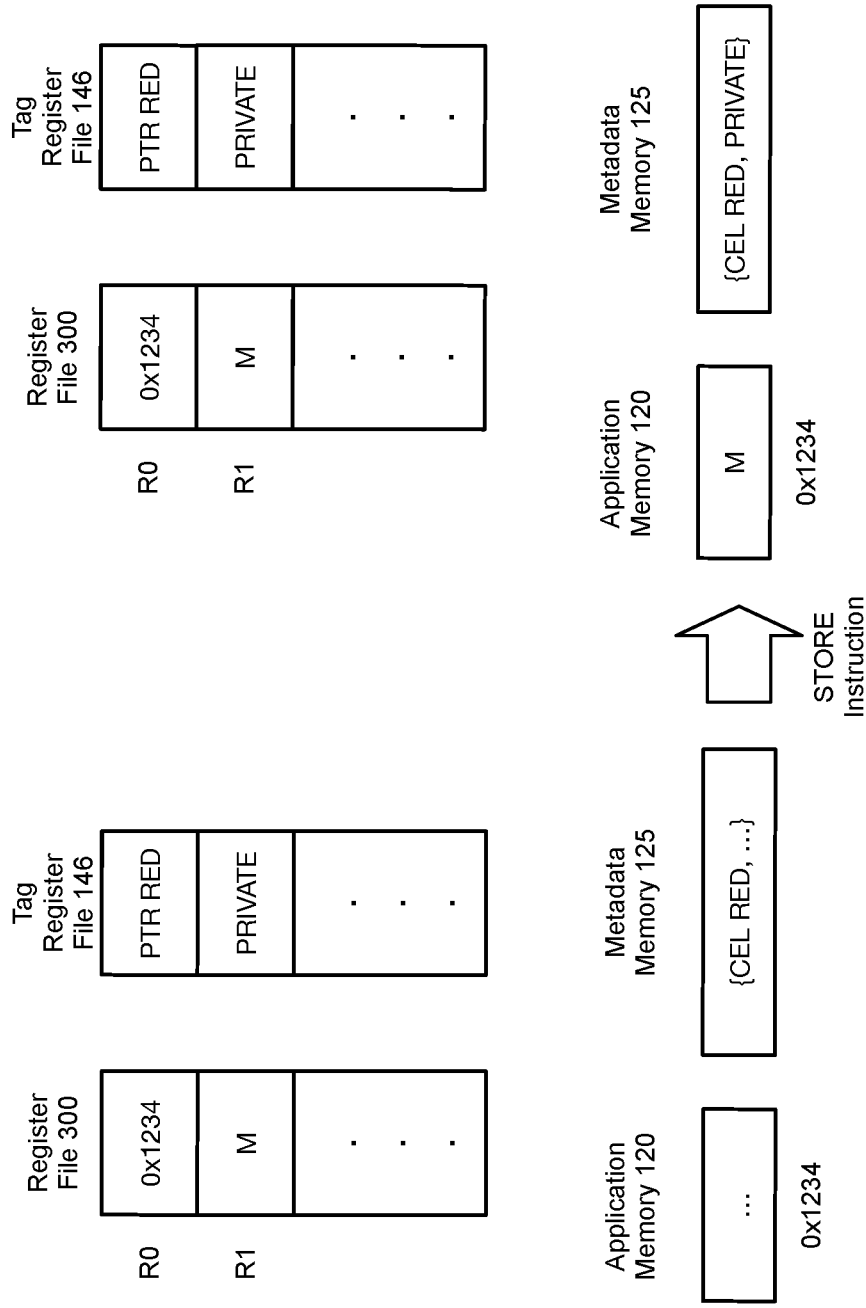

FIGS. 3A-C show an illustrative register file 300, in accordance with some embodiments. For instance, the register file 300 may be used by the illustrative host processor 110 in the example of FIG. 1 to execute one or more instructions.

As discussed in connection with FIG. 1, the illustrative tag processing hardware 140 may be configured to check if an instruction executed by the host processor 110 should be allowed. The tag processing hardware 140 may perform this check based on one or more inputs, such as an instruction type (e.g., opcode) of the instruction, a metadata tag for a program counter, a metadata tag for an application memory address from which the instruction is fetched (e.g., a word in memory to which the program counter points), a metadata tag for a register in which an operand of the instruction is stored, and/or a metadata tag for an application memory address referenced by the instruction.

FIG. 3A shows an example involving an arithmetic instruction such as an ADD instruction. The arithmetic instruction may have two operands, which may be stored, respectively, in registers R0 and R1 of the register file 300. A result of the arithmetic instruction may be stored in a register R2 of the register file 300.

In some embodiments, a privacy policy may be enforced by the tag processing hardware 140. Each of the registers R0 and R1 may have a corresponding entry in the illustrative tag register 146 in the example of FIG. 1, indicating whether a value stored in the register is considered public or private. In this example, the entry corresponding to the register R0 stores a metadata tag encoding a metadata symbol PUBLIC, indicating the value stored in the register R0 may be considered public, while the entry corresponding to the register R0 stores a metadata tag encoding a metadata symbol PRIVATE, indicating the value stored in the register R0 may be considered private.

In some embodiments, the privacy policy may include a rule that indicates a result of combining a public value with a private value should be considered private. Accordingly, if the tag processing hardware 140 determines that the arithmetic instruction should be allowed, the tag processing hardware 140 may update an entry in the tag register file 146 corresponding to the result register R2. For instance, the entry may be updated with a metadata tag encoding the metadata symbol PRIVATE.

It should be appreciated that the privacy policy described above is provided solely for purposes of illustration, as aspects of the present disclosure are not limited to any particular privacy policy, or any privacy policy at all. For instance, in some embodiments, one or more other metadata symbols (e.g., TOP SECRET, SECRET, CONFIDENTIAL, etc.) may be used in addition to, or instead of, PUBLIC and PRIVATE.

FIG. 3B shows an example involving a load instruction. The load instruction may have one operand, which may be stored in the register R0 of the register file 300. This operand may be a pointer that includes an application memory address from which a value is to be loaded. The loaded value may be stored in the register R1 of the register file 300.

In some embodiments, an access control policy may be enforced by the tag processing hardware 140. The register R0 may have a corresponding entry in the tag register 146 indicating one or more access privileges associated with the pointer stored in the register R0. For instance, in the example of FIG. 3B, the entry corresponding to the register R0 stores a metadata tag encoding a metadata symbol PTR RED.

Additionally, or alternatively, a location in the application memory 120 referenced by the pointer stored in the register R0 may have a corresponding location in the illustrative metadata memory 125 in the example of FIG. 1. Metadata stored in this metadata memory location may indicate one or more access conditions for the application memory location referenced by the pointer stored in the register R0. For instance, in the example of FIG. 3B, the metadata memory location stores a metadata tag encoding the metadata symbol CEL RED, indicating that a pointer with an associated access privilege PTR RED may be allowed to access the application memory location.

It should be appreciated that the access control policy described above is provided solely for purposes of illustration, as aspects of the present disclosure are not limited to using any particular access control policy, or any access control policy at all. For instance, in some embodiments, the metadata memory location corresponding to the application memory location referenced by the pointer stored in the register R0 may store a metadata tag encoding a set of metadata symbols (e.g., CEL RED, CEL BLUE, CEL GREEN, . . . ), indicating that a pointer associated with any of these access privileges may be allowed to access the application memory location.

In some embodiments, an information flow policy may be enforced by the tag processing hardware 140, in addition to, or instead of, an access control policy. For instance, in the example of FIG. 3B, the metadata memory location corresponding to the application memory location referenced by the pointer stored in the register R0 may store a metadata tag encoding a metadata symbol PRIVATE, indicating that a value stored at the application memory location may be considered private. If the tag processing hardware 140 determines that the load instruction should be allowed, the tag processing hardware 140 may, according to a rule of the information flow policy, update an entry in the tag register file 146 corresponding to the register R1. For instance, the entry may be updated with a metadata tag encoding the metadata symbol PRIVATE.

It should be appreciated that the information flow policy described above is provided solely for purposes of illustration, as aspects of the present disclosure are not limited to any particular information flow policy, or any information flow policy at all.

FIG. 3C shows an example involving a store instruction. The store instruction may have two operands, which may be stored, respectively, in the registers R0 and R1 of the register file 300. The register R0 may store a pointer that includes an application memory address to which a value is to be stored. That value may be stored in the register R1.

In the example of FIG. 3C, the entry in the tag register 146 corresponding to the register R0 stores a metadata tag encoding the metadata symbol PTR RED, and the metadata memory location corresponding to the application memory location referenced by the pointer stored in the register R0 stores a metadata tag encoding the metadata symbol CEL RED. The tag processing hardware 140 may identify (e.g., from the illustrative rule cache 144 in the example of FIG. 1) a rule of the access control policy indicating that a pointer with an associated access privilege PTR RED may be allowed to access an application memory location with an associated access condition CEL RED. Accordingly, the tag processing hardware 140 may allow the store instruction to proceed.

Moreover, in the example of FIG. 3C, the entry in the tag register file 146 corresponding to the register R1 stores a metadata tag encoding the metadata symbol PRIVATE, indicating that the value stored in the register R1 may be considered private. Upon determining that the store instruction should be allowed, the tag processing hardware 140 may, according to a rule of the information flow policy, update the metadata memory location corresponding to the application memory location referenced by the pointer stored in the register R0. For instance, that metadata memory location may be updated with a metadata tag encoding the metadata symbol PRIVATE.

The inventors have recognized and appreciated that, in each of the examples of FIGS. 3A-C, metadata update is performed only for target locations. No metadata update is performed for source locations. For instance, in the example of FIG. 3A, metadata update is performed only for the register R2. No metadata update is performed for either of the registers R0 and R1.

Similarly, in the example of FIG. 3B, metadata update is performed only for the register R2. No metadata update is performed for the application memory location referenced by the pointer stored in the register R0, or the register R0 itself. In the example of FIG. 3C, metadata update is performed only for the application memory location referenced by the pointer stored in the register R0. No metadata update is performed for the register R0 or the register R1.

The inventors have recognized and appreciated that, in some instances, it may be desirable to provide metadata update for a source location, in addition to, or instead of, metadata update for a target location. For example, a source register of an arithmetic instruction may store a value that is supposed to be read only a limited number of times (e.g., once). Similarly, a source memory location of a load instruction, or a source register of a store instruction, may store a value that is supposed to be read only a limited number of times (e.g., once). As another example, an address register of a load or store instruction may store a pointer that is supposed to be used only a limited number of times (e.g., once). Therefore, in these examples, it may be desirable to update metadata associated with a source location to indicate how many times the source location has already been accessed.

The inventors have further recognized and appreciated that an ability to update metadata for a source location may be useful for metadata removal. For instance, when a location (e.g., register or memory location) is allocated for a selected purpose, appropriate metadata may be associated with the location to indicate how the location may be accessed. Once the location has been accessed according to the selected purpose, it may be desirable to remove the associated metadata, so that the location may be allocated for another purpose. The inventors have recognized and appreciated that it may be advantageous to perform such metadata removal immediately upon accessing the location for the selected purpose.

Figures 4A, 4B:
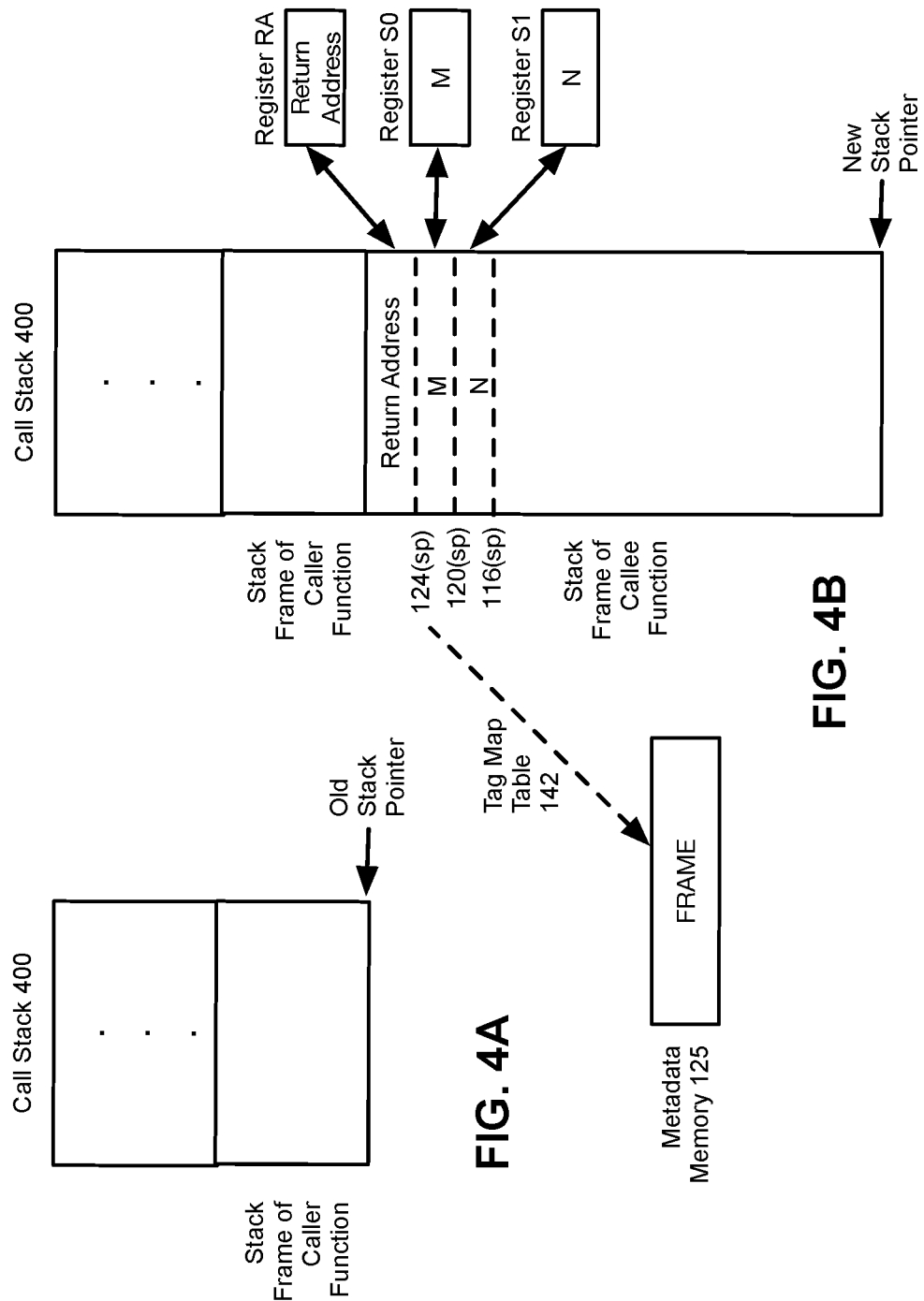
FIGS. 4A-B show an illustrative call stack 400, in accordance with some embodiments.

FIGS. 4A-B shows an illustrative call stack 400, in accordance with some embodiments. The call stack 400 may reside in the illustrative application memory 120 in the example of FIG. 1, and may store information about functions that are being executed by the illustrative host processor 110. One or more of the techniques described herein may be used to remove metadata associated with memory locations in the call stack 400.

In the example of FIG. 4A, a stack pointer is maintained that points to a top of the call stack 400, where a stack frame of a function that is currently active is located. When this function calls another function, the call stack 400 may be grown by adding a stack frame of the callee function, as shown in FIG. 4B.

In some embodiments, the callee function may have a function prologue, which may include instructions for setting up the callee function's stack frame. An example is shown below.

88000780: f8010113 addi sp,sp,−128
88000784: 06812c23 sw s0,120(sp)
88000788: 06112e23 sw ra,124(sp)
8800078c: 06912a23 sw s1,116(sp)

In this example, the stack pointer is moved down 128 bytes to make room for the callee function's stack frame. A content of a link register (RA) may be stored at a location that is 124 bytes up from the new stack pointer (and hence 4 bytes down from the old stack pointer). This content may include a return address, which may indicate a location in the caller function's code to which control should be returned when the callee function finishes executing.

In some embodiments, the callee function may use one or more registers of the host processor 110 in the example of FIG. 1. Under some calling conventions, the callee function may be responsible for preserving values stored in such registers (e.g., by the caller function) upon entry of the callee function, so that the values may be restored to these registers when the callee function returns. For instance, in the example of FIG. 4B, the callee function's prologue may store contents of registers S0 and S1 at stack frame locations that are, respectively, 120 bytes and 116 bytes up from the new stack pointer.

In some embodiments, an instruction in the callee function's prologue, such as the store instruction sw ra,124(sp), may be associated with metadata that indicates the instruction belongs to a function prologue (e.g., PRO). When the store instruction sw ra,124(sp) is executed by the host processor 110 in the example of FIG. 1, this metadata may cause the illustrative tag processing hardware 140 in the example of FIG. 1 to update metadata associated with the application memory location 124(sp). For instance, a rule may be installed in the illustrative rule cache 144 in the example of FIG. 1 that indicates, if an application memory location (e.g., 124(sp)) is written to by a function's prologue (e.g., a store instruction tagged PRO), then no application code except epilogue code (e.g., any function's epilogue, or just that particular function's epilogue) may access that application memory location. Because the store instruction sw ra,124(sp) is associated with metadata that indicates the instruction belongs to a function prologue (e.g., PRO), execution of the store instruction sw ra,124(sp) may trigger the above-described rule, and the tag processing hardware 140 may update metadata associated with the application memory location 124(sp) to indicate that no application code except epilogue code (e.g., any function's epilogue, or the callee function's epilogue) may access the application memory location 124(sp). This may prevent an attacker from overwriting the return address to cause a jump to malicious code.

In some embodiments, the tag processing hardware 140 may perform this metadata update by looking up 124(sp) in the illustrative tag map table 142 in the example of FIG. 1 to identify a corresponding location in the illustrative metadata memory 125 in the example of FIG. 1, and storing a metadata tag encoding a metadata symbol FRAME in the corresponding metadata memory location.

In some embodiments, the callee function's epilogue may include instructions for tearing down the callee function's stack frame. An example is shown below.

880007a4: 07c12083 lw ra,124(sp)
880007a8: 07812403 lw s0,120(sp)
880007ac: 07412483 lw s1,116(sp)
880007b0: 08010113 addi sp,sp,128
880007b4: 00008067 ret In this example, the stack pointer is moved up 128 bytes back to the caller function's stack frame. The return address stored at the application memory location 124(sp) may be loaded into the link register (RA), and the values saved at the application memory locations 120(sp) and 116(sp) may be restored to the registers S0 and S1, respectively.

The inventors have recognized and appreciated that, because the application memory location 124(sp) is a source location of the load instruction lw ra,124(sp), there may be no metadata update for the application memory location 124(sp). Thus, after the load instruction lw ra,124(sp), a metadata tag encoding the metadata symbol FRAME may remain in the metadata memory location corresponding to the application memory location 124(sp). This may prevent, for example, a prologue of another function from writing to the application memory location 124(sp), which may be undesirable.

One approach to removing such metadata may be to insert one or more store instructions. An example is shown below.

880007a4: 07c12083 lw ra,124(sp)
   sw ra, 124(sp)
880007a8: 07812403 lw s0,120(sp)
   sw s0, 120(sp)
880007ac: 07412483 lw s1,116(sp)
   sw s1, 116(sp)
880007b0: 08010113 addi sp,sp,128
880007b4: 00008067 ret In this example, a store instruction sw ra, 124(sp) is inserted after the load instruction lw ra,124(sp). The inserted instruction sw ra, 124(sp) may be associated with metadata that indicates the instruction belongs to a function epilogue (e.g., EPI). When the inserted instruction sw ra,124(sp) is executed by the host processor 110, this metadata may cause the tag processing hardware 140 to update metadata associated with the application memory location 124(sp). For instance, a rule may be installed in the rule cache 144 that indicates, if an application memory location (e.g., 124(sp)) is written to by a function's epilogue (e.g., a store instruction tagged EPI), then metadata associated with that application memory location may be removed. Because the inserted instruction sw ra,124(sp) is associated with metadata that indicates the instruction belongs to a function epilogue (e.g., EPI), execution of the inserted instruction sw ra,124(sp) may trigger the above-described rule, and the tag processing hardware 140 may remove the metadata associated with the application memory location 124(sp) (e.g., by writing NULL, or some other default value, over the existing metadata).

The inventors have recognized and appreciated possible disadvantages of the above approach for removing metadata. For instance, inserting an additional store instruction for each load instruction in a function epilogue may cause the host processor 110 to perform additional work, which may be inefficient. Moreover, in some instances, it may not be possible or practical to modify a compiler to perform such insertions.

Accordingly, in some embodiments, techniques are provided for triggering metadata update for a source location of an instruction. For instance, such metadata update may be triggered by execution of the instruction itself. In this manner, insertion of an additional instruction may not be needed.

As discussed in connection with the example of FIG. 1, the illustrative tag processing hardware 140 may send a query to the illustrative policy processor 150 to check if an instruction executed by the illustrative host processor 110 should be allowed. The policy processor 150 may evaluate one or more policies on one or more inputs in the query (e.g., one or more input metadata tags) to determine if the instruction should be allowed. If the instruction is not to be allowed, the policy processor 150 may so notify the tag processing hardware 140. If the instruction is to be allowed, the policy processor 150 may compute one or more outputs (e.g., one or more output metadata tags) to be returned to the tag processing hardware 140.

In some embodiments, the one or more outputs computed by the policy processor 150 may include an output metadata tag for a source location of the instruction, in addition to, or instead of, an output metadata tag for a target location of the instruction. As one example, the instruction may be a load instruction, and the policy processor 150 may compute an output metadata tag for an application memory address from which data is loaded, in addition to, or instead of, an output metadata tag for a register holding the data loaded from memory. As another example, the instruction may be a store instruction, and the policy processor 150 may compute an output metadata tag for a register holding data to be stored to memory, in addition to, or instead of, an output metadata tag for an application memory address to which the data is to be stored. As another example, the instruction may be an arithmetic instruction, and the policy processor 150 may compute an output metadata tag for a register holding an input to the arithmetic instruction, in addition to, or instead of, an output metadata tag for a register for storing a result of executing the arithmetic instruction.

In some embodiments, the illustrative rule cache 144 in the example of FIG. 1 may be configured to map one or more inputs to a decision and/or one or more outputs, for instance, based on a query response from the policy processor 150. Thus, like the policy processor 150, the rule cache 144 may be configured to provide an output metadata tag for a source location of an instruction, in addition to, or instead of, an output metadata tag for a target location of the instruction. For instance, the rule cache 144 may provide an output metadata tag for an application memory address from which data is loaded, an output metadata tag for a register holding data to be stored to memory, and/or an output metadata tag for a register holding an input to an arithmetic instruction, as described above in connection with the policy processor 150.

However, it should be appreciated that aspects of the present disclosure are not limited to populating the rule cache 144 based on a response from the policy processor 150. In some embodiments, a mapping may be installed into the rule cache 144 ahead of time, and may include an output metadata tag for a source location of an instruction, in addition to, or instead of, an output metadata tag for a target location of the instruction.

Figure 5:
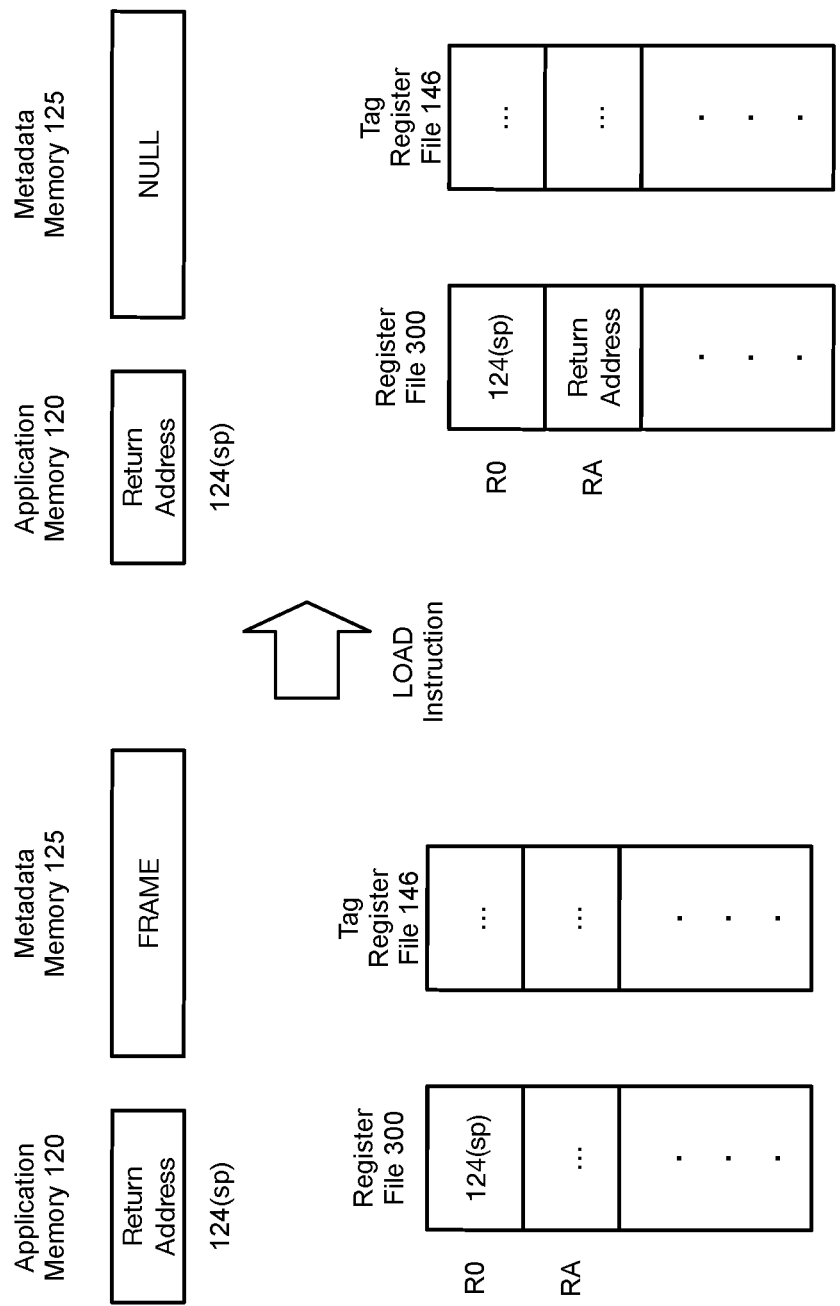
FIG. 5 shows an example of a metadata update for a source location of a load instruction, in accordance with some embodiments.

FIG. 5 shows an example of a metadata update for a source location of a load instruction, in accordance with some embodiments. For instance, FIG. 5 may show metadata update for a source location of the load instruction lw ra,124(sp) in the illustrative function epilogue described above.

In some embodiments, the load instruction lw ra,124(sp) may be associated with metadata that indicates the instruction belongs to a function epilogue (e.g., EPI). When the load instruction lw ra,124(sp) is executed by the host processor 110, this metadata may cause the tag processing hardware 140 to update metadata associated with the application memory location 124(sp).

For instance, a rule may be installed in the rule cache 144 that indicates, if an application memory location (e.g., 124(sp)) is associated with metadata (e.g., FRAME) that indicates no application code except epilogue code may access the application memory location, and the application memory location is being read by a function's epilogue (e.g., a load instruction tagged EPI), then the instruction may be allowed, and the metadata associated with that application memory location may be removed. In the example of FIG. 5, because the application memory location 124(sp) is associated with the metadata symbol FRAME, which indicates no application code except epilogue code may access the application memory location 124(sp), and the load instruction lw ra,124(sp) is associated with the metadata symbol EPI, which indicates the instruction belongs to a function epilogue, execution of the load instruction lw ra,124(sp) may trigger the above-described rule, and the tag processing hardware 140 may remove the metadata associated with the application memory location 124(sp). For example, the tag processing hardware may write NULL (which may be represented by a string of a suitable number of 0's), or some other default value, over the existing metadata. This may be accomplished without any inserted store instruction.

Although details of implementation are shown in FIG. 5 and described above, it should be appreciated that such details are provided solely for purposes of illustration. Aspects of the present disclosure are not limited to any particular manner of implementation. For instance, in some embodiments, the application memory location 124(sp) may be associated with a metadata symbol (e.g., RETURN) that indicates a value stored in the application memory location 124(sp) is a return address, in addition to, or instead of, a metadata symbol (e.g., FRAME) that indicates no application code except epilogue code may access the application memory location 124(sp).

Figure 6:
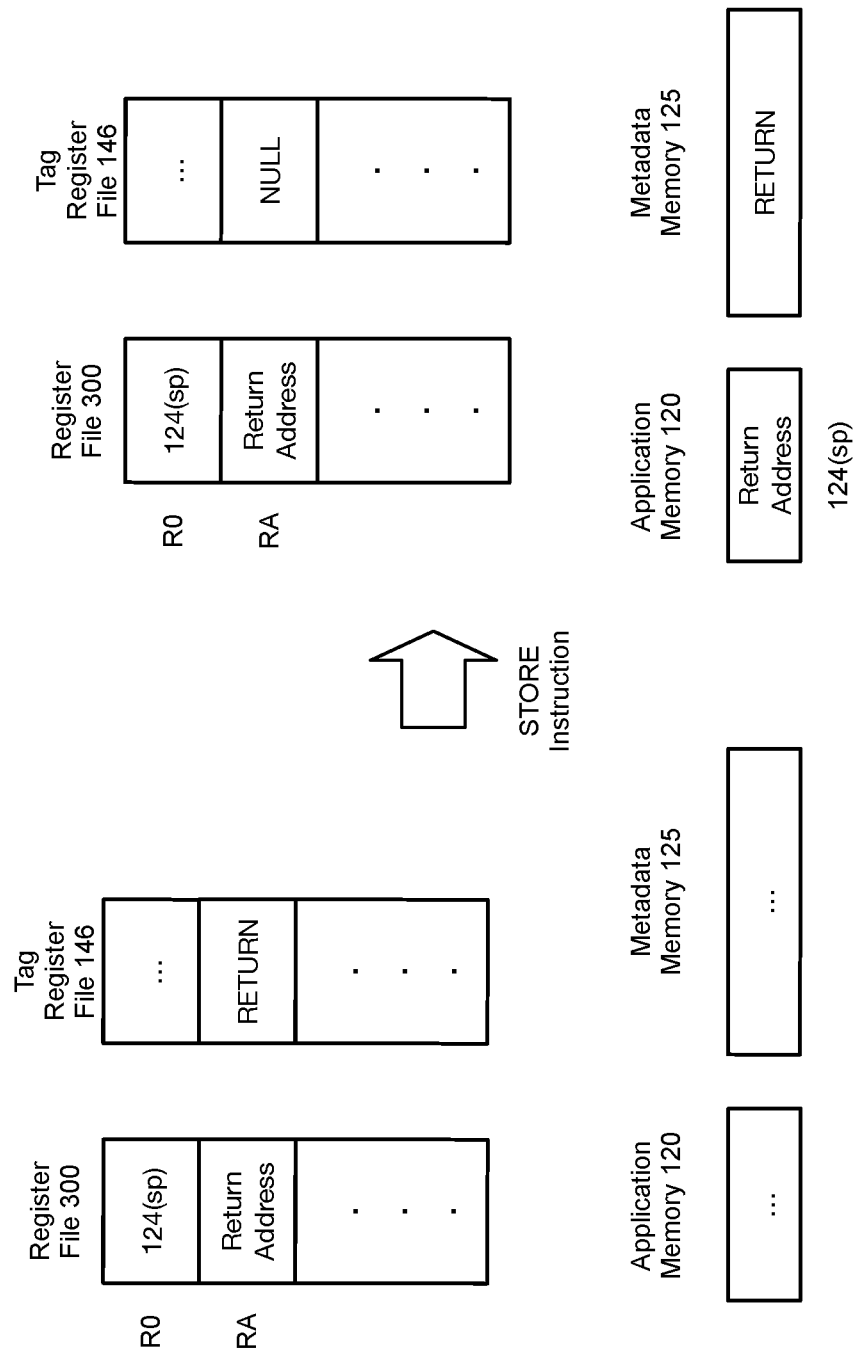
FIG. 6 shows an example of a metadata update for a source location of a store instruction, in accordance with some embodiments.

FIG. 6 shows an example of a metadata update for a source location of a store instruction, in accordance with some embodiments. For instance, FIG. 6 may show metadata update for a source location of the load instruction sw ra,124(sp) in the illustrative function prologue described above.

Referring again to the example of FIG. 4, when the caller function calls the callee function, a calling instruction (e.g., a Branch-and-Link instruction) of the caller function may copy the return address, which may be stored in a program counter, into the link register RA.[1] This may trigger a rule in the rule cache 144 that causes the tag processing hardware 140 to associate RETURN with the link register RA. For instance, the metadata symbol RETURN may be associated with the program counter, and the calling instruction may be associated with metadata for triggering the rule. Once triggered, the rule may cause the tag processing hardware 140 to propagate metadata from the program counter to the link register RA.

[1] Note that the calling instruction of the caller function stores the return address into the link register RA on entry to the callee function. By contrast, FIG. 5 shows the return address being loaded into the link register from the call stack 400 on exit from the callee function.

In some embodiments, execution of the store instruction sw ra,124(sp) of the illustrative function prologue described above may trigger a rule in the rule cache 144 that causes the tag processing hardware 140 to propagate the metadata symbol RETURN from the entry in the illustrative tag register file 146 in the example of FIG. 1 corresponding to the link register RA, to the metadata memory location corresponding to the application memory location 124(sp).

Additionally, or alternatively, the rule triggered by the store instruction sw ra,124(sp) may cause the tag processing hardware 140 to remove the metadata associated with the link register RA (e.g., by writing NULL, or some other default value, over the existing metadata). In some embodiments, no rule may be installed in the rule cache 144 that allows user code to write to a location associated with the metadata symbol RETURN. Thus, replacing RETURN with NULL at the tag register file entry corresponding to the link register RA may allow the link register RA to be written again (e.g., with another return address).

Although details of implementation are shown in FIG. 6 and described above, it should be appreciated that such details are provided solely for purposes of illustration. For instance, aspects of the present disclosure are not limited to updating metadata associated with a source location of a store instruction. Additionally, or alternatively, a direct memory access (DMA) operation may trigger an update of metadata associated with a source location of the DMA operation.

Figure 7:
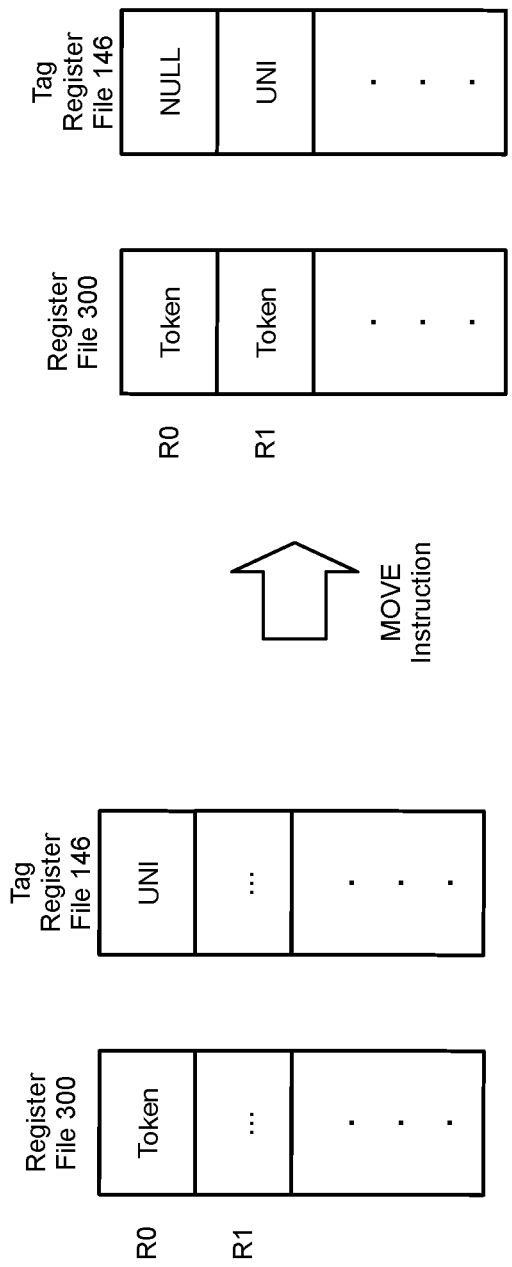
FIG. 7 shows an example of a metadata update for a source location of a register-to-register transfer instruction, in accordance with some embodiments.

FIG. 7 shows an example of a metadata update for a source location of a register-to-register transfer instruction, in accordance with some embodiments. For instance, FIG. 7 may show metadata update for a move instruction mv r1 r0 which, when executed, may cause the host processor 110 to copy a value stored in a source register R0 into a target register R1.

In some embodiments, the source register R0 may store a value that is of high importance. For instance, the host process 110 may be part of a controller for a critical piece of equipment, and may be programmed to activate the equipment by writing a designated code into a memory-mapped register of the controller. Therefore, it may be desirable to ensure that only one instance of the code exists at any point in time.

Accordingly, in some embodiments, the source register R0 may be associated with metadata (e.g., UNI) that indicates the value stored in the source register R0 may not be duplicated. When the move instruction mv r1 r0 is executed by the host processor 110, this metadata may cause the tag processing hardware 140 to update metadata associated with the source register R0.

For instance, a rule may be installed in the rule cache 144 that indicates one or more access control conditions for a source register (e.g., R0). If the source register is being accessed by a move instruction satisfying the one or more conditions, the move instruction may be allowed. Additionally, or alternatively, the rule may indicate that, if the source register is associated with metadata (e.g., UNI) indicating that a value stored in the source register may not be duplicated, then, upon execution of the move instruction, such metadata may be disassociated from the source register, and may instead be associated with a target register of the move instruction.

Returning to the example of FIG. 7, execution of the move instruction mv r1 r0 may trigger the above-described rule, and the tag processing hardware 140 may remove the metadata associated with the source register R0. For example, the tag processing hardware may write NULL (which may be represented by a string of a suitable number of 0's), or some other default value, over the existing metadata. Additionally, or alternatively, the tag processing hardware 140 may associate the metadata with the target register R1.

The inventors have recognized and appreciated that it may be beneficial to associate the metadata symbol UNI with the target register R1, and to disassociate the same from the source register R0, in a single metadata operation. If the metadata symbol UNI is instead disassociated from the source register R0 by inserting a dummy move instruction (e.g., mv r0 r1), there may be a point in time (e.g., after the move instruction mv r1 r0 has been checked but before the dummy move instruction mv r0 r1 is checked) when both the source register R0 and the target register R1 are associated with the metadata symbol UNI. This may be undesirable, because an attacker may be able to cause an interrupt at that point in time, and the value stored in the source register R0 may be copied elsewhere with the metadata symbol UNI, resulting in multiple copies of that value. However, it should be appreciated that aspects of the present disclosure are not limited to disassociating metadata in any particular manner, or at all.

Although a move instruction is described above in connection with the example of FIG. 7, it should be appreciated that aspects of the present disclosure are not so limited. In some embodiments, the metadata symbol "UNI" may be associated with a target register of a load instruction and disassociated with a source memory location of the load instruction. Additionally, or alternatively, the metadata symbol "UNI" may be associated with a target memory location of a store instruction and disassociated with a source register of the store instruction.

The inventors have recognized and appreciated that it may be desirable to provide tag processing hardware in a manner that is independent of host processor design. Accordingly, in some embodiments, a hardware interface may be provided to coordinate interactions between a host processor (e.g., the illustrative host processor 110 in the example of FIG. 1) and tag processing hardware (e.g., the illustrative tag processing hardware 140 in the example of FIG. 1).

Figure 8:
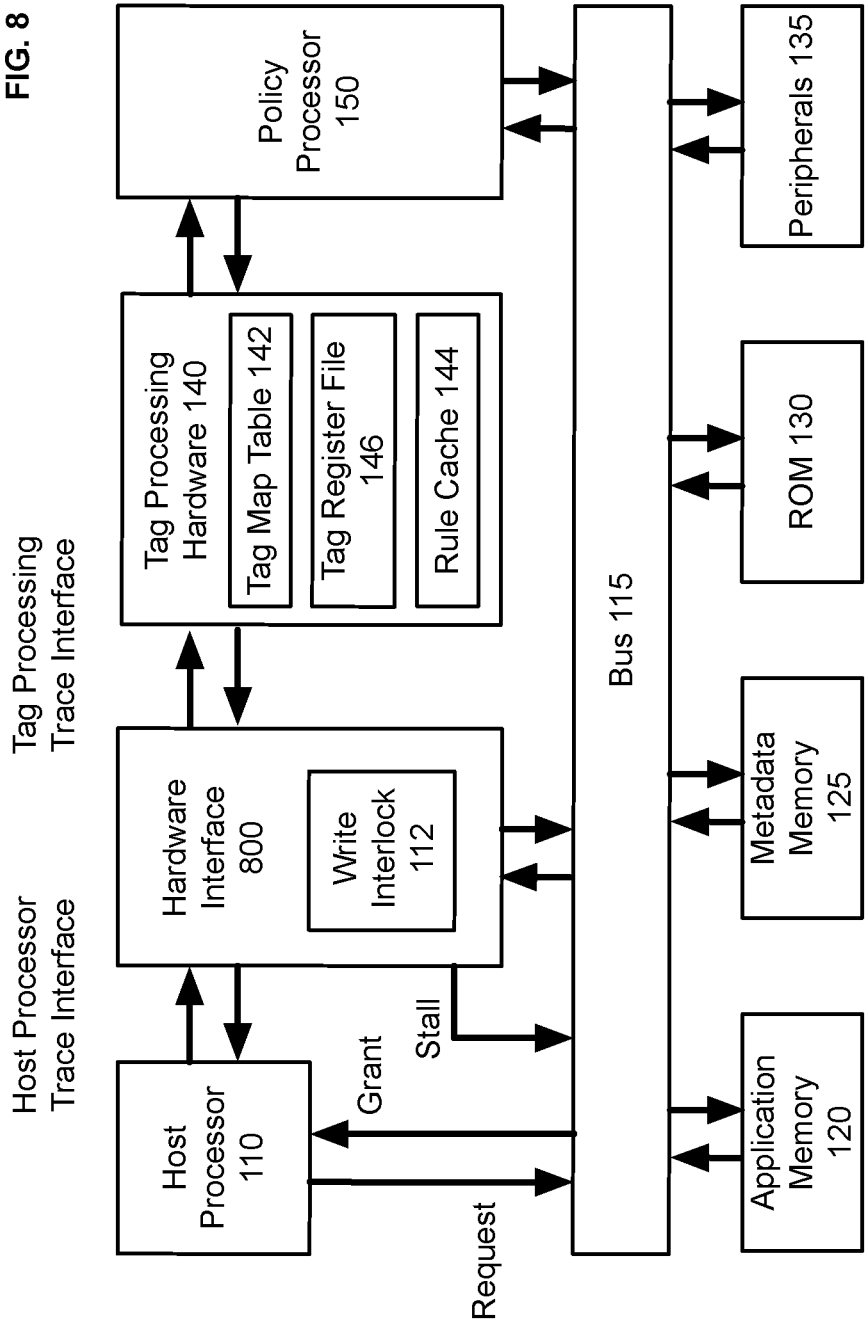
FIG. 8 shows an illustrative hardware interface 800, in accordance with some embodiments.

FIG. 8 shows an illustrative hardware interface 800, in accordance with some embodiments. In this example, the hardware interface 800 includes a write interlock (e.g., the illustrative write interlock 112 in the example of FIG. 1). The inventors have recognized and appreciated that write interlock designs may vary depending on host processor designs. Therefore, it may be desirable to include the write interlock 112 as part of the hardware interface 800, so that the tag processing hardware 140 may be provided in a manner that is independent of host processor design.

However, it should be appreciated that aspects of the present disclosure are not limited to any particular component, or any particular arrangement of components. In some embodiments, the write interlock 112 may be part of the tag processing hardware 140, or may not be included at all.

In some embodiments, the host processor 110 may, via a host processor trace interface, inform the hardware interface 800 that an instruction has been executed by the host processor 110. The hardware interface 800 may in turn inform the tag processing hardware 140 via a tag processing trace interface. In this manner, the hardware interface 800 may transform instruction information received from the host processor 110 into instruction information expected by the tag processing hardware 140.

For instance, the hardware interface 800 may transform one or more instructions in an ISA of the host processor 110 into one or more instructions in an ISA of the tag processing hardware 140. Illustrative techniques for transforming instructions are described in International Patent Application No. PCT/US2019/016276, filed on Feb. 1, 2019, entitled "SYSTEMS AND METHODS FOR TRANSFORMING INSTRUCTIONS FOR METADATA PROCESSING," which is incorporated herein by reference in its entirety. However, it should be appreciated that aspects of the present disclosure are not limited to any particular technique for instruction transformation, or to any instruction transformation at all.

Figure 9A:
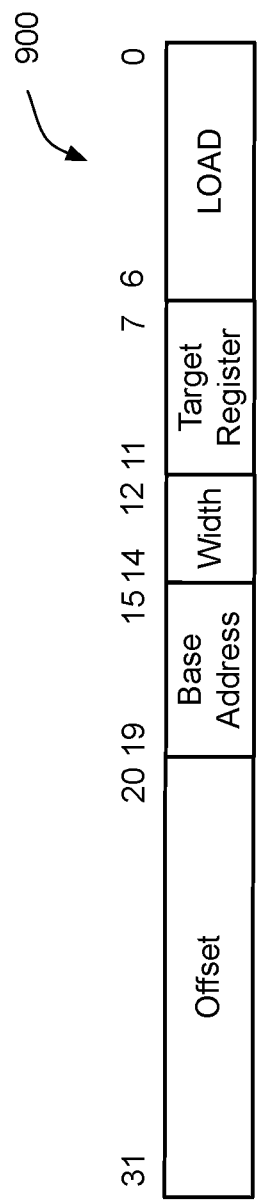
FIG. 9A shows an illustrative encoded instruction 900, in accordance with some embodiments.

FIG. 9A shows an illustrative encoding 900 of an instruction, in accordance with some embodiments. In this example, the encoding 900 includes 32 bits, where bits 0 through 6 may encode an opcode (e.g., LOAD), bits 7 through 11 may encode a register identifier (e.g., an identifier for a target register of a load instruction), bits 12 through 14 may encode a width (e.g., word, halfword, byte, etc.), bits 15 through 19 may encode an application memory address (e.g., a base address of the load instruction), and bits 20 through 31 may encode an offset (e.g., an offset to be added to the base address of the load instruction to obtain a source address from which data is to be loaded).

Although illustrative fields are shown in FIG. 9A and described above, it should be appreciated that aspects of the present disclosure are not limited to any particular field or combination of fields in an encoding. For instance, in some embodiments, a source address may be provided directly, in addition to, or instead of, a base address and an offset.

In some embodiments, the encoding 900 may be in an ISA used by the host processor 110, and may be received by the hardware interface 800 via the host processor trace interface. The hardware interface 800 may decode the encoding 900, and may output relevant information to the tag processing hardware 140 via the tag processing trace interface. For instance, the hardware interface 800 may output the opcode, the register identifier, the base address, and the offset. The width may not be relevant for metadata processing, and therefore may be omitted. However, it should be appreciated that aspects of the present disclosure are not limited to omitting any particular field, or any field at all.

It should be appreciated that aspects of the present disclosure are not limited to performing decoding. In some embodiments, the host processor 110 may provide, via the host processor trace interface, one or more decoded fields of an instruction (e.g., opcode, register identifier, width, base address, offset, etc.), in addition to, or instead of an encoding of the instruction. Additionally, or alternatively, the host processor 110 may provide a program counter via the host processor trace interface. The program counter may point to an application memory address from which the encoding 900 was fetched. The hardware interface 800 may forward the one or more decoded fields and/or the program counter to the tag processing hardware 140, without performing any decoding.

In some embodiments, the tag processing hardware 140 may use instruction information received from the hardware interface 800 to construct a query to the illustrative rule cache 144 or the illustrative policy processor 150 in the example of FIG. 1. For instance, the tag processing hardware 140 may use the illustrative tag map table 142 in the example of FIG. 1 to identify one or more metadata storage locations corresponding, respectively, to the register identifier, the base address, the offset, and/or the program counter received from the hardware interface 800. Such a metadata storage location may be, for example, in the illustrative tag register file 146 or the illustrative metadata memory 125 in the example of FIG. 1. The tag processing hardware 140 may retrieve metadata from one or more identified locations, and may use the retrieved metadata to construct a query.

The inventors have recognized and appreciated that it may be advantageous to provide different metadata storage locations corresponding, respectively, to different offsets. For instance, referring to the example shown in FIG. 5 and described above, a metadata storage location associated with a base address may store metadata indicating that the base address is within a stack frame, whereas a metadata storage location associated with an offset may store metadata corresponding to that offset. In this manner, different offsets within the stack frame may be associated, respectively, with different metadata (e.g., different colors).

As an example, a buffer in a stack frame may be associated with a first color, whereas a location adjacent to the buffer may be associated with a second color different from the first color. This may advantageously provide more fine-grained access control within the stack frame. For instance, malicious code performing a buffer overflow attack may attempt to use a pointer associated with the first color to access (e.g., write to, or read from) the adjacent location, which may trigger a policy violation because the first color does not match the second color. However, it should be appreciated that aspects of the present disclosure are not limited to providing different metadata storage locations for different offsets, or providing a metadata storage location for any offset at all.

The inventors have further recognized and appreciated that, in some instances, the host processor 110 may not make a base address or an offset available via the host processor trace interface. Instead, the host processor may only make available an address obtained by adding the offset to the base address. Thus, to facilitate more fine-grained access control, it may be desirable to have the hardware interface 800 decode an encoding of an instruction to obtain a base address and an offset. However, as noted above, aspects of the present disclosure are not limited to performing decoding.

Figure 9B:
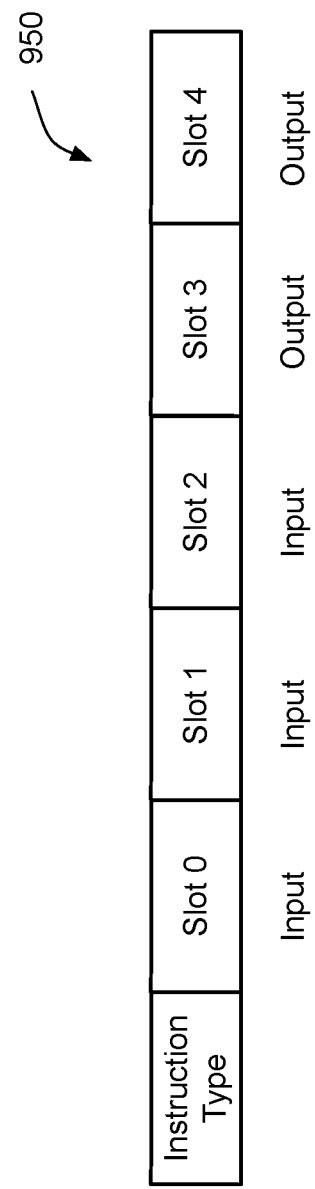
FIG. 9B shows an illustrative rule cache entry 950, in accordance with some embodiments.

FIG. 9B shows an illustrative rule cache entry 950, in accordance with some embodiments. In this example, the rule cache entry 950 is associated with an instruction type (e.g., an opcode in an ISA of the host processor 110 or an ISA of the tag processing hardware 140). Additionally, or alternatively, the rule cache entry 950 may include one or more slots, where each slot may store a metadata tag.

In some embodiments, the rule cache entry 950 may be an entry in the rule cache 144, which may be configured to compare metadata from a query against metadata stored in one or more slots in the rule cache entry 950 to determine if there is a match. Such a slot may be designated as an input slot. For instance, in the example of FIG. 9B, slots 0-2 may be designated as input slots.

In some embodiments, if it is determined that a query matches the rule cache entry 950, the rule cache 144 may output metadata based on metadata stored in one or more slots in the rule cache entry 950. Such a slot may be designated as an output slot. For instance, in the example of FIG. 9B, slots 3-4 may be designated as output slots.

Referring again to the example of FIG. 9A, the tag processing hardware 140 may retrieve metadata tags T0, T1, and T2 from the metadata storage locations corresponding, respectively, to the application memory address, the program counter, and/or the offset received from the hardware interface 800. The tag processing hardware 140 may then construct a query based on the opcode received from the hardware interface 800, as well as the retrieve metadata tags. For instance, a query may be constructed as <LOAD, T0, T1, T2>.

In some embodiments, the query <LOAD, T0, T1, T2> may be used to look up the rule cache 144. In response, the rule cache 144 may match the metadata tags T0, T1, and T2 against metadata stored, respectively, in slot 0, slot 1, and slot 2 of one or more entries associated with the opcode LOAD. If a matching entry is found, the rule cache 144 may output metadata tags T3 and T4 based on metadata stored, respectively, in slot 3 and slot 4 of the matching entry.

In some embodiments, the tag processing hardware 140 may use the output metadata tag T3 to update the metadata storage location corresponding to the register identifier received from the hardware interface 800. Additionally, or alternatively, the tag processing hardware 140 may use the output metadata tag T4 to update the metadata storage location corresponding to the application memory address received from the hardware interface 800. In this manner, the tag processing hardware 140 may effectuate a metadata update for a source location of a load instruction (e.g., as discussed in connection with the example of FIG. 5).

Although a load instruction is described above in connection with the examples of FIGS. 9A-B, it should be appreciated that aspects of the present disclosure are not limited to any particular instruction type. In some embodiments, the tag processing hardware 140 may effectuate, in a similar manner, a metadata update for a source location of a store instruction (e.g., as discussed in connection with the example of FIG. 6), a move instruction (e.g., as discussed in connection with the example of FIG. 7), and/or a direct memory access instruction. For instance, the tag processing hardware 140 may use output metadata tags to update metadata storage locations associated, respectively, with a source register and a target memory location of a store instruction. Additionally, or alternatively, the tag processing hardware 140 may use output metadata tags to update metadata storage locations associated, respectively, with source and target registers of a move instruction. Additionally, or alternatively, the tag processing hardware 140 may use output metadata tags to update metadata storage locations associated, respectively, with source and target memory locations.

It should also be appreciated that aspects of the present disclosure are not limited to querying the rule cache 144. Additionally, or alternatively, the policy processor 150 may be queried in a similar manner, and may return similar output metadata tags.

Although an illustrative configuration of a rule cache entry is shown in FIG. 9B and described above, it should be appreciated that aspects of the present disclosure are not limited to configuring a rule cache in any particular manner. For instance, in some embodiments, a slot may be used for matching in some rule cache entries, and for output in some other rule cache entries. Such a slot may therefore be designated as an input slot in some instances, and as an output slot in other instances. As an example, in some embodiments, slot 3 may be designated as an output slot for load, store, move, and/or direct memory access instructions, but may be designated as an input slot for branch instructions (e.g., for matching a metadata tag retrieved from a metadata storage location corresponding a program counter).

Additionally, or alternatively, a rule cache may include entries with no input slot, which may advantageously reduce an amount of circuit area used to implement the rule cache. The inventors have recognized and appreciated that, despite having not input slot, such entries may be useful in enforcing rules relating to information flow. Additionally, or alternatively, a rule cache may include entries with no output slot, which may advantageously reduce an amount of circuit area used to implement the rule cache. The inventors have recognized and appreciated that, despite having not output slot, such entries may be useful in enforcing rules relating to access control. Illustrative techniques for enforcing information flow rules and access control rules are described in International Patent Application No. PCT/US2020/013678, filed on Jan. 15, 2020, entitled "SYSTEMS AND METHODS FOR METADATA CLASSIFICATION," which is incorporated herein by reference in its entirety. However, it should be appreciated that aspects of the present disclosure are not limited to any particular type of rules.

Illustrative configurations of various aspects of the present disclosure are provided below.

1. A method for updating metadata, comprising acts of: in response to detecting an instruction executed by a hardware system, identifying a source location of the instruction; determining, based at least in part on first metadata associated with the instruction whether the instruction is allowed, wherein: determining whether the instruction is allowed comprises identifying a rule that matches one or more inputs, the one or more inputs comprising the first metadata associated with the instruction; and the rule maps the one or more inputs to one or more outputs, the one or more outputs comprising second metadata to be associated with the source location of the instruction; and in response to determining that the instruction is allowed, causing the source location of the instruction to be associated with the second metadata.

2. The method of configuration 1, wherein: the source location of the instruction comprises an application data storage location; and the method further comprises acts of: identifying a metadata storage location corresponding to the application data storage location; and causing the source location of the instruction to be associated with the second metadata comprises causing the second metadata to be written to the metadata storage location corresponding to the application data storage location.

3. The method of configuration 2, wherein: the source location of the instruction comprises an entry in a register file of the hardware system; and the instruction comprises an instruction that reads data from the entry in the register file and writes the data to a target location of the instruction.

4. The method of configuration 3, wherein: the register file of the hardware system comprises a first register file; and the metadata storage location to which the second metadata is written comprises an entry in a second register file.

5. The method of configuration 3, wherein: the instruction comprises a store instruction executed by a host processor in the hardware system; and the target location to which the data is written by the instruction comprises an application memory location.

6. The method of configuration 3, wherein: the entry in the register file comprises a first entry; the instruction comprises a register-to-register transfer instruction executed by a host processor in the hardware system; and the target location to which the data is written by the instruction comprises a second entry in the register file.

7. The method of configuration 2, wherein: the source location of the instruction comprises an application memory location; the instruction comprises a load instruction executed by a host processor in the hardware system; and the load instruction reads data from the application memory location and writes the data to a target location of the load instruction.

8. The method of configuration 7, wherein: the metadata storage location to which the second metadata is written comprises a metadata memory location.

9. The method of configuration 2, wherein: the source location of the instruction comprises a first application memory location; the instruction comprises a direct memory access instruction executed by direct memory access hardware in the hardware system; and the direct memory access instruction reads data from the first application memory location and writes the data to a second application memory location.

10. The method of configuration 1, wherein: the instruction comprises an instruction of an epilogue of a function; and the source location of the instruction comprises a location in a stack frame of the function.

11. The method of configuration 10, wherein: the one or more inputs further comprises third metadata associated with the source location of the instruction; the third metadata indicates the source location of the instruction is to be protected under a stack frame policy; the instruction comprises a load instruction that restores a value preserved at the source location of the instruction to a register; and the second metadata associated with the source location of the instruction indicates the stack frame policy is no longer applicable to the storage location.

12. The method of configuration 1, wherein: identifying a source location of the instruction comprises: decoding an encoding of the instruction to obtain one or more fields; and identifying the source location of the instruction based on at least one of the one or more fields.

13. The method of configuration 12, wherein: the one or more fields comprise a program counter, a base address, and an offset; the first metadata associated with the instruction comprises metadata associated with the program counter; and the one or more inputs further comprise metadata associated with the base address and metadata associated with the offset.

14. A method for updating metadata, comprising acts of: in response to detecting an instruction executed by a host processor, identifying a storage location read by the instruction; determining, based at least in part on first metadata associated with the instruction, whether the instruction is allowed; and in response to determining that the instruction is allowed, causing the storage location to be associated with second metadata, the second metadata being different from first metadata.

15. A system comprising circuitry and/or one or more processors programmed by executable instructions, wherein the circuitry and/or the one or more programmed processors are configured to perform the method of any of configurations 1-14.

16. At least one computer-readable medium having stored thereon at least one netlist for the circuitry of configuration 15.

17. At least one computer-readable medium having stored thereon at least one hardware description that, when synthesized, produces the at least one netlist of configuration 16.

18. The at least one computer-readable medium of configuration 17, wherein the at least one hardware description is in an encrypted form.

19. At least one computer-readable medium having stored thereon the executable instructions of configuration 15.

Figure 10:
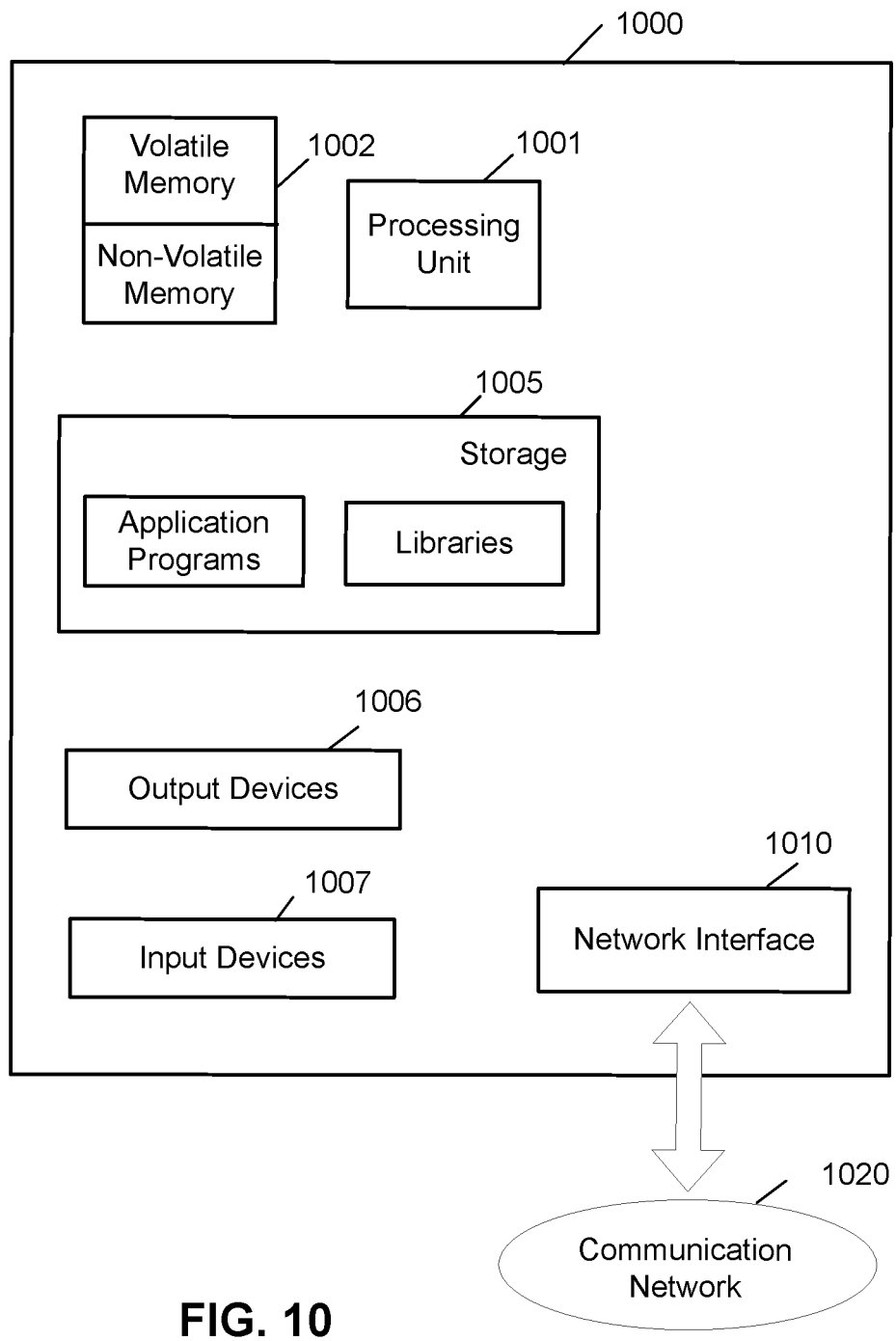
FIG. 10 shows, schematically, an illustrative computer 1000 on which any aspect of the present disclosure may be implemented.

FIG. 10 shows, schematically, an illustrative computer 1000 on which any aspect of the present disclosure may be implemented. In the example shown in FIG. 10, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 10. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1007 may include a microphone for capturing audio signals, and the output devices 1006 may include a display screen for visually rendering, and/or a speaker for audibly rendering, recognized text.

In the example of FIG. 10, the computer 1000 may also include one or more network interfaces (e.g., the network interface 1010) to enable communication via various networks (e.g., the network 1020). Examples of networks include local area networks (e.g., an enterprise network), wide area networks (e.g., the Internet), etc. Such networks may be based on any suitable technology, and may operate according to any suitable protocol. For instance, such networks may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey how the fields are related. However, any suitable mechanism may be used to relate information in fields of a data structure, including through the use of pointers, tags, or other mechanisms that how the data elements are related.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," "based on," "according to," "encoding," and variations thereof herein, is meant to encompass the items listed thereafter and equivalents thereof as well as additional items.

What is claimed is:

1. A method for updating metadata, comprising acts of:
   in response to detecting an instruction executed by a hardware system, identifying a source location of the instruction;
   determining, based at least in part on first metadata associated with the instruction, whether the instruction is allowed, wherein:
      determining whether the instruction is allowed comprises identifying a rule that matches one or more inputs, the one or more inputs comprising the first metadata associated with the instruction; and
      the rule maps the one or more inputs to one or more outputs, the one or more outputs comprising second metadata to be associated with the source location of the instruction; and
   in response to determining that the instruction is allowed, causing the source location of the instruction to be associated with the second metadata.

2. The method of claim 1, wherein:
   the source location of the instruction comprises an application data storage location;
   the method further comprises an act of identifying a metadata storage location corresponding to the application data storage location; and
   causing the source location of the instruction to be associated with the second metadata comprises causing the second metadata to be written to the metadata storage location corresponding to the application data storage location.

3. The method of claim 2, wherein:
   the source location of the instruction comprises an entry in a register file of the hardware system; and
   the instruction comprises an instruction that reads data from the entry in the register file and writes the data to a target location of the instruction.

4. The method of claim 3, wherein:
   the register file of the hardware system comprises a first register file; and
   the metadata storage location to which the second metadata is written comprises an entry in a second register file.

5. The method of claim 3, wherein:
   the instruction comprises a store instruction executed by a host processor in the hardware system; and
   the target location to which the data is written by the instruction comprises an application memory location.

6. The method of claim 3, wherein:
   the entry in the register file comprises a first entry;
   the instruction comprises a register-to-register transfer instruction executed by a host processor in the hardware system; and the target location to which the data is written by the instruction comprises a second entry in the register file.

7. The method of claim 2, wherein:
the source location of the instruction comprises an application memory location;
the instruction comprises a load instruction executed by a host processor in the hardware system; and
the load instruction reads data from the application memory location and writes the data to a target location of the load instruction.

8. The method of claim 7, wherein:
the metadata storage location to which the second metadata is written comprises a metadata memory location.

9. The method of claim 2, wherein:
the source location of the instruction comprises a first application memory location;
the instruction comprises a direct memory access instruction executed by direct memory access hardware in the hardware system; and
the direct memory access instruction reads data from the first application memory location and writes the data to a second application memory location.

10. The method of claim 1, wherein:
the instruction comprises an instruction of an epilogue of a function; and
the source location of the instruction comprises a location in a stack frame of the function.

11. The method of claim 10, wherein:
the one or more inputs further comprise third metadata associated with the source location of the instruction;
the third metadata indicates the source location of the instruction is to be protected under a stack frame policy;
the instruction comprises a load instruction that restores a value preserved at the source location of the instruction to a register; and
the second metadata associated with the source location of the instruction indicates the stack frame policy is no longer applicable to the storage location.

12. The method of claim 1, wherein:
identifying a source location of the instruction comprises:
decoding an encoding of the instruction to obtain one or more fields; and
identifying the source location of the instruction based on at least one of the one or more fields.

13. The method of claim 12, wherein:
the one or more fields comprise a program counter, a base address, and an offset;
the first metadata associated with the instruction comprises metadata associated with the program counter; and
the one or more inputs further comprise metadata associated with the base address and metadata associated with the offset.

14. A system comprising hardware circuitry and/or one or more hardware processors programmed by executable instructions, wherein the hardware circuitry and/or the one or more programmed hardware processors are configured to perform a method for updating metadata, the method comprising acts of:
in response to detecting an instruction executed by a hardware system, identifying a source location of the instruction;
determining, based at least in part on first metadata associated with the instruction, whether the instruction is allowed, wherein:
determining whether the instruction is allowed comprises identifying a rule that matches one or more inputs, the one or more inputs comprising the first metadata associated with the instruction; and
the rule maps the one or more inputs to one or more outputs, the one or more outputs comprising second metadata to be associated with the source location of the instruction; and
in response to determining that the instruction is allowed, causing the source location of the instruction to be associated with the second metadata.

15. The system of claim 14, wherein:
the source location of the instruction comprises an application data storage location;
the method further comprises an act of identifying a metadata storage location corresponding to the application data storage location; and
causing the source location of the instruction to be associated with the second metadata comprises causing the second metadata to be written to the metadata storage location corresponding to the application data storage location.

16. The system of claim 15, wherein:
the source location of the instruction comprises an entry in a register file of the hardware system; and
the instruction comprises an instruction that reads data from the entry in the register file and writes the data to a target location of the instruction.

17. The system of claim 16, wherein:
the register file of the hardware system comprises a first register file; and
the metadata storage location to which the second metadata is written comprises an entry in a second register file.

18. The system of claim 16, wherein:
the instruction comprises a store instruction executed by a host processor in the hardware system; and
the target location to which the data is written by the instruction comprises an application memory location.

19. The system of claim 16, wherein:
the entry in the register file comprises a first entry;
the instruction comprises a register-to-register transfer instruction executed by a host processor in the hardware system; and
the target location to which the data is written by the instruction comprises a second entry in the register file.

20. The system of claim 15, wherein:
the source location of the instruction comprises an application memory location;
the instruction comprises a load instruction executed by a host processor in the hardware system; and
the load instruction reads data from the application memory location and writes the data to a target location of the load instruction.

21. The system of claim 20, wherein:
the metadata storage location to which the second metadata is written comprises a metadata memory location.

22. The system of claim 15, wherein:
the source location of the instruction comprises a first application memory location;
the instruction comprises a direct memory access instruction executed by direct memory access hardware in the hardware system; and
the direct memory access instruction reads data from the first application memory location and writes the data to a second application memory location.

23. The system of claim 14, wherein:
the instruction comprises an instruction of an epilogue of a function; and
the source location of the instruction comprises a location in a stack frame of the function.

24. The system of claim 23, wherein:
the one or more inputs further comprise third metadata associated with the source location of the instruction;
the third metadata indicates the source location of the instruction is to be protected under a stack frame policy;
the instruction comprises a load instruction that restores a value preserved at the source location of the instruction to a register; and
the second metadata associated with the source location of the instruction indicates the stack frame policy is no longer applicable to the storage location.

25. The system of claim 14, wherein:
identifying a source location of the instruction comprises:
  decoding an encoding of the instruction to obtain one or more fields; and
  identifying the source location of the instruction based on at least one of the one or more fields.

26. The system of claim 25, wherein:
the one or more fields comprise a program counter, a base address, and an offset;
the first metadata associated with the instruction comprises metadata associated with the program counter; and
the one or more inputs further comprise metadata associated with the base address and metadata associated with the offset.

27. At least one non-transitory computer-readable medium having stored thereon at least one hardware description for circuitry and/or executable instructions for programming one or more processors, wherein the circuitry and/or the one or more programmed processors are configured to perform a method for updating metadata, the method comprising acts of:
in response to detecting an instruction executed by a hardware system, identifying a source location of the instruction;
determining, based at least in part on first metadata associated with the instruction, whether the instruction is allowed, wherein:
determining whether the instruction is allowed comprises identifying a rule that matches one or more inputs, the one or more inputs comprising the first metadata associated with the instruction; and
the rule maps the one or more inputs to one or more outputs, the one or more outputs comprising second metadata to be associated with the source location of the instruction; and
in response to determining that the instruction is allowed, causing the source location of the instruction to be associated with the second metadata.

* * * * *